US011821260B2

(12) United States Patent
Colson et al.

(10) Patent No.: US 11,821,260 B2
(45) Date of Patent: Nov. 21, 2023

(54) MULTI-LAYER FABRIC AND COVERINGS FOR ARCHITECTURAL FEATURES AND METHODS OF MANUFACTURE

(71) Applicant: Hunter Douglas Inc., Pearl River, NY (US)

(72) Inventors: Wendell B. Colson, Vineyard Haven, MA (US); Abdel-Fattah Mohamed Seyam, Cary, NC (US)

(73) Assignee: HUNTER DOUGLAS INC., Pearl River, NY (US)

( * ) Notice: Subject to any disclaimer, the term of this patent is extended or adjusted under 35 U.S.C. 154(b) by 1057 days.

(21) Appl. No.: 16/179,164

(22) Filed: Nov. 2, 2018

(65) Prior Publication Data
US 2019/0136614 A1    May 9, 2019

Related U.S. Application Data

(60) Provisional application No. 62/582,012, filed on Nov. 6, 2017.

(51) Int. Cl.
*E06B 9/34* (2006.01)
*B32B 5/26* (2006.01)
(Continued)

(52) U.S. Cl.
CPC ............. *E06B 9/34* (2013.01); *B32B 3/18* (2013.01); *B32B 5/02* (2013.01); *B32B 5/024* (2013.01); *B32B 5/26* (2013.01); *B32B 7/05* (2019.01); *B32B 7/09* (2019.01); *D03D 1/007* (2013.01); *D03D 1/08* (2013.01); *D03D 11/02* (2013.01); *E06B 9/24* (2013.01); *E06B 9/262* (2013.01); *E06B 9/266* (2013.01); *B32B 2250/20* (2013.01); *B32B 2307/41* (2013.01); *B32B 2307/412* (2013.01);
(Continued)

(58) Field of Classification Search
CPC . E04D 13/033; E06B 9/40; E06B 9/42; E06B 9/44; E06B 2009/543; E06B 9/54;
(Continued)

(56) References Cited

U.S. PATENT DOCUMENTS 3,384,519 A * 5/1968 Froget .................... E06B 9/303
156/65
5,718,799 A * 2/1998 Colson .................... B29C 65/02
156/166
(Continued)

FOREIGN PATENT DOCUMENTS

CN     101892543 A    11/2010
CN     102068191 A     5/2011
(Continued)

OTHER PUBLICATIONS

English-language translation of Korean Patent Office dated Feb. 17, 2023, received in a corresponding foreign application, 9 pages.

*Primary Examiner* — Abe Massad
*Assistant Examiner* — Matthew R. Shepherd
(74) *Attorney, Agent, or Firm* — Scully Scott Murphy & Presser

(57) ABSTRACT

The present disclosure relates to multi-layered fabrics and coverings for architectural features and methods for manufacturing the same. More particularly, the present disclosure relates to a three-dimensional multi-layered fabric having a first or front exterior layer, a plurality of intermediate or interior layers, and a second or back exterior layer, which are separable from one another, and their method of manufacture, and panels and/or coverings for architectural features having or comprised of a multi-layered fabric, and methods of making the same. The plurality of interior layers extends between the exterior layers, and the separation and stitching of the two paired intermediate layers from at least one of the front exterior layer and back exterior layer are at different locations (points), respectively, which facilitates the formation of a cell, and controls the size and shape of the cell that may form between the two paired, intermediate layers.

36 Claims, 9 Drawing Sheets

(51) Int. Cl.
  *E06B 9/266* (2006.01)
  *E06B 9/24* (2006.01)
  *D03D 1/00* (2006.01)
  *D03D 11/02* (2006.01)
  *B32B 7/09* (2019.01)
  *D03D 1/08* (2006.01)
  *B32B 5/02* (2006.01)
  *B32B 7/05* (2019.01)
  *B32B 3/18* (2006.01)
  *E06B 9/262* (2006.01)

(52) U.S. Cl.
  CPC ..... *B32B 2307/414* (2013.01); *B32B 2419/00* (2013.01); *E06B 2009/2435* (2013.01); *E06B 2009/2447* (2013.01); *E06B 2009/2458* (2013.01); *E06B 2009/2627* (2013.01)

(58) Field of Classification Search
  CPC ........ E06B 9/62; E06B 9/58; E06B 2009/583; E06B 9/72; E06B 2009/2627; E06B 9/34; E06B 9/24; E06B 9/262; E06B 9/266; B32B 5/263; B32B 3/085; B32B 2307/412; B32B 7/09; B32B 7/05; B32B 3/18; D03D 1/08; D03D 1/007; D03D 11/02; D10B 2503/02
  See application file for complete search history.

(56) References Cited

U.S. PATENT DOCUMENTS

| | | | | |
|---|---|---|---|---|
| 6,152,068 | A * | 11/2000 | Colson | B29C 65/18 |
| | | | | 101/479 |
| 6,289,964 | B1 * | 9/2001 | Colson | E06B 9/32 |
| | | | | 160/121.1 |
| 6,582,794 | B1 * | 6/2003 | Fransen | D03D 11/00 |
| | | | | 428/101 |
| 7,694,696 | B2 * | 4/2010 | Chang | E06B 9/28 |
| | | | | 139/423 |
| 8,353,326 | B2 * | 1/2013 | Chang | D03D 1/007 |
| | | | | 160/84.05 |
| 10,253,562 | B2 * | 4/2019 | Chou | E06B 9/34 |
| 2001/0001414 | A1 * | 5/2001 | Colson | E06B 9/78 |
| | | | | 160/178.1 R |
| 2002/0020142 | A1 * | 2/2002 | Swiszcz | E04B 9/0414 |
| | | | | 52/783.1 |
| 2004/0226663 | A1 * | 11/2004 | Smith | E06B 9/68 |
| | | | | 160/84.05 |
| 2009/0288731 | A1 | 11/2009 | Chang et al. | |
| 2010/0218841 | A1 * | 9/2010 | Chang | D03D 15/513 |
| | | | | 139/408 |
| 2010/0294439 | A1 * | 11/2010 | Su | E06B 9/262 |
| | | | | 160/84.05 |
| 2014/0138037 | A1 * | 5/2014 | Colson | E06B 9/34 |
| | | | | 160/290.1 |
| 2014/0261851 | A1 | 9/2014 | Cha | |
| 2017/0247941 | A1 * | 8/2017 | Colson | E06B 9/40 |
| 2018/0119485 | A1 * | 5/2018 | Colson | B29C 65/18 |
| 2018/0119487 | A1 * | 5/2018 | Colson | E06B 9/34 |
| 2018/0209211 | A1 * | 7/2018 | Rupel | E06B 9/36 |
| 2020/0164619 | A1 * | 5/2020 | Tuoriniemi | B32B 5/14 |

FOREIGN PATENT DOCUMENTS

| | | |
|---|---|---|
| CN | 106761336 A | 5/2017 |
| EP | 2216433 A2 | 8/2010 |
| EP | 2733302 A2 | 5/2014 |
| KR | 100815577 B1 | 3/2008 |
| WO | 2009131351 A2 | 10/2009 |

\* cited by examiner

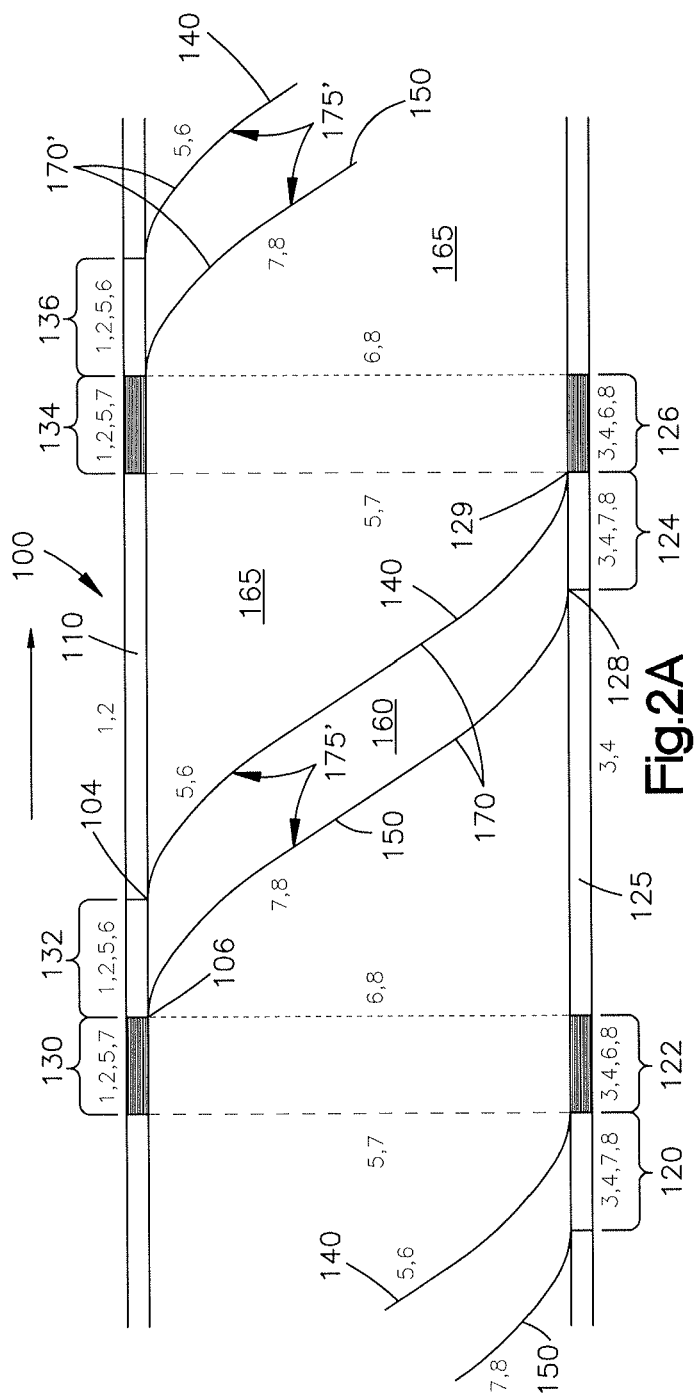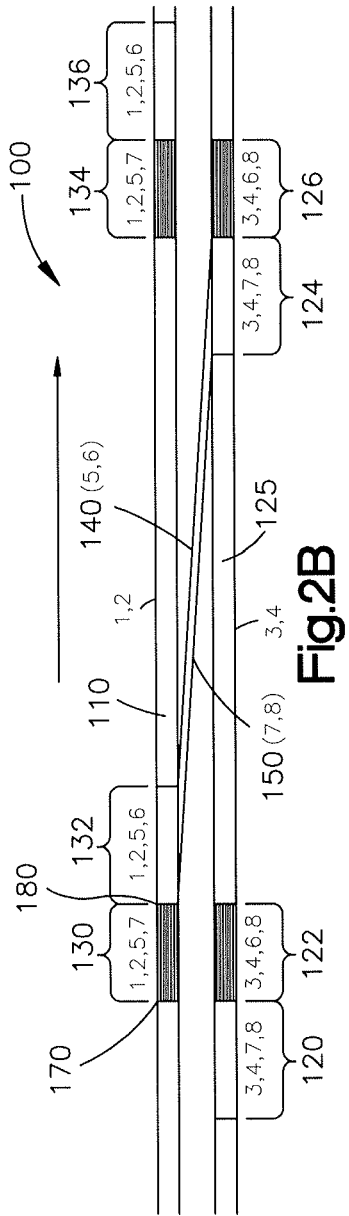

MULTI-LAYER FABRIC AND COVERINGS FOR ARCHITECTURAL FEATURES AND METHODS OF MANUFACTURE

FIELD OF DISCLOSURE

The present disclosure relates to multi-layered fabrics and coverings for architectural features and methods for manufacturing the same. More particularly, the present disclosure relates to a three dimensional multi-layered fabric having a top or front layer, one or more intermediate layers, and a bottom or back layer, which are separable from one another and joined at selected regions by woven stitches, and their method of manufacture, and panels and/or coverings for architectural features having or comprised of a multi-layered fabric, and methods of making the same.

CROSS-REFERENCE TO RELATED APPLICATIONS

This application claims the benefit of priority to U.S. Application No. 62/582,012, filed Nov. 6, 2017, which is incorporated herein by reference in its entirety.

BACKGROUND

Multi-layered fabrics formed of a top or front surface (or exterior) layer; a bottom, rear or back surface (or exterior) layer; and one or more intermediate layers, may have many uses and applications. The use and application of such multi-layered fabrics may include as a covering for architectural features, room dividers or partitions, filters, and the like. The architectural features may include windows, door frames, archways, and the like, and the covering formed at least partially of a multi-layered fabric may be particularly useful for windows to provide an aesthetic look, and desirable shading, view-through, and privacy.

In one embodiment, multi-layer fabrics as used in coverings, e.g., window coverings, may include a front layer, a back layer, and one or more intermediate layers, preferably of smaller length than the front or back layer, and that extend between, and are connected directly or indirectly to, the front and back layers. The multi-layered fabric may have a collapsed position or condition where the front, intermediate, and back layers are generally adjacent to each other and generally parallel, and an expanded position or condition where the front and back layers are separated from one another and the intermediate layers extend between the front and back layers at an angle. The front and back exterior layers may control the movement and angular orientation of the intermediate layers. In particular, in different embodiments of a multi-layer fabric, lateral and vertical movement of the front and back layers relative to each other may move and rotate or pivot the intermediate layers, and move the multi-layered fabric from a collapsed to an expanded position. The intermediate layers, depending upon the construction of the multi-layered fabric, may form what may be referred to as a vane element or slat. A popular window covering that may use a multi-layer fabric would include sheer shadings sold under the brand name Silhouette® by Hunter Douglas®.

The multi-layered fabrics may be made in numerous manners including by attaching the intermediate layers to the front layer and back layer in numerous ways and in numerous locations. One manner of making a multi-layered fabric, which may have application as a window covering, includes weaving (or by stitching) the one or more intermediate layers with the front and back layers. For example, a multi-layer fabric may be formed by a weaving process. EP 2216 433 A2 describes a multi-layer fabric having a front surface layer, a back surface layer, a first intermediate layer and second intermediate layer. The intermediate layers may be separable from one another and are connected to the surface layers using woven stitches. The multi-layer fabric may be collapsed to a two-dimensional (2D) shape or position, and may be opened to a three-dimensional (3D) shape or expanded position by moving the front surface and the back surface layers relative to each other. The multi-layered fabric is intended for use as materials for window coverings.

EP 2216 433 A2 describes a multi-layered fabric where the stitching of the two intermediate layers with the front surface layer continues for a certain length, and then the two intermediate layers both separate from the surface layer together at a single point or location. The two intermediate layers extend without stitching to each other (e.g., without weaving together) or with any other layer for a certain length followed by stitching both intermediate layers with the back layer starting at the same point. In other words, the intermediate layers in the embodiments in EP 2216 433 A2 are connected to the surface layer at one and the same points or regions and are connected to the back layer at one and the same points or regions in a repeating fashion.

The separation and stitching of the intermediate layers with the surface layers at the same points do not allow the two intermediate layers to separate and form cells as indicated by the figures in EP 2216 433 A2. Rather, the intermediate layers will tend to stay close together which does not provide control over the formation and/or size of the cell between the intermediate layers. The two intermediate layers may separate slightly but not to any appreciable extent or in a controlled manner.

SUMMARY OF INVENTION

The purpose and advantages of the disclosed multi-layered fabric, architectural panel and covering, and their method of manufacture will be set forth in, and be apparent from, the drawings, description, and claims that follow. The summary of the disclosure is given to aid understanding the multi-layered fabric, panel, and covering, and its method of manufacture, and not with an intent to limit the disclosure or the invention. The present disclosure is directed to a person of ordinary skill in the art. It should be understood that each of the various aspects and features of the disclosure may advantageously be used separately in some instances, or in combination with other aspects and features of the disclosure in other instances. Accordingly, while the disclosure is presented in terms of embodiments, it should be appreciated that individual aspects of any embodiment can be utilized separately, or in combination with aspects and features of that embodiment or any other embodiment. In accordance with the present disclosure, variations and modifications may be made to the multi-layered fabric, architectural panel, or covering, and its method of manufacture, to achieve different effects.

In one embodiment, the present disclosure features a method of manufacturing a multi-layered fabric or structure using a weaving process, preferably a continuous weaving process, to create a multi-layered fabric having separable layers that are joined at selected regions by woven stitches. In one embodiment, the multi-layered fabric may include one or more exterior layers and one or more interior or intermediate layers. The multi-layered structure or fabric may be configured as an expandable and collapsible panel formed of a first exterior layer, which may also be referred to as a top or front layer, a second exterior layer, which may also be referred to as a back, rear, or bottom layer, and a plurality of shorter intermediate layers extending between the front and back layers. In one embodiment, the disclosure features use of the multi-layered fabric, for example, as a covering for architectural features, which may include windows, doorways, archways, and the like. The front and back layers in a covering product may also be referred to as support members, or front and back support members, respectively. In one embodiment, the plurality of intermediate layers, also referred to as vane elements in a covering, may extend between the support members, e.g., the front (top) layer and the back (rear) layer, and preferably may be coupled to or woven with the support members. The vertical support members may be substantially parallel and laterally movable with respect to each other to expand or collapse the multi-layered panel or fabric. The plurality of intermediate layers may move from an orientation that is substantially parallel to the exterior layers in the collapsed condition to an orientation that is transverse to or at an angle with respect to the exterior layers in the expanded condition. In one embodiment, both the front and back vertical support members may be laterally moveable with respect to each other, may control the movement and angular orientation of the intermediate layers, and may control the formation of a cell between pairs of the intermediate layers.

In one embodiment, a multi-layered fabric is disclosed that includes a front or first exterior layer; a back or second exterior layer; at least one and preferably a plurality of first interior or intermediate layers extending between the front and back exterior layer; and at least one and preferably a plurality of second interior or intermediate layers extending between the front and back exterior layers, with the second intermediate layers, being separate from the first intermediate layers. In an embodiment, preferably each first intermediate layer is paired with a second intermediate layer to form a plurality of paired intermediate layers. In an embodiment, the paired intermediate layers are in close proximity to each other, and portions of each are stitched, e.g., weaved, with at least one or the first (front) exterior layer and the second (back) exterior layer. The first intermediate layer in the multi-layered fabric in an embodiment is weaved with the first exterior layer at different locations or regions than the locations or regions that the second intermediate layer is weaved with the first exterior layer. In an asepct, the first intermediate layer may be connected to (e.g., woven with), and in embodiments also not connected to (e.g. woven with), the first exterior layer at different locations or regions than the second intermediate layer is connected to (e.g., woven with), and also not connected to (e.g., not woven with), the first exterior layer.

The first intermediate layer of the multi-layered fabric in one embodiment is weaved with the second exterior layer such that it is connected to (e.g., woven with), and in embodiments also not connected to (e.g., not woven with), the second exterior layer at different locations or regions than the locations or regions that the second intermediate layer is weaved with the second exterior layer such that it is connected to (e.g., woven with), and in embodiments also not connected to (e.g., not woven with), the second exterior layer. According to one aspect, each of the first and second intermediate layers are separate from both the first exterior and second exterior layers and from each other for a length, and in an embodiment the lengths that the first intermediate layers extend from the first exterior layer to the second exterior layer are the same as the lengths that the second intermediate layers extend from the first exterior layer to the second exterior layer.

The multilayer fabric in embodiments has a plurality of paired intermediate layers that include a first intermediate layer and a second intermediate layer. In one embodiment, the multi-layered fabric comprises a plurality of first intermediate layers and a plurality of second intermediate layers and proximate first and second intermediate layers form paired intermediate layers or paired middle layers. The first intermediate layer of the paired middle layers preferably extends from at least one of the first and second exterior layers at a different location than the second intermediate layer of the paired intermediate layers extends from at least one of the first and second exterior layers. The first intermediate layer of the paired middle layers preferably extends from at least the other of the first and second exterior layers at a different location than the second intermediate layer of the paired middle layers extends from at least the other of the first and second exterior layers. The paired middle layers preferably are proximate to each other, and preferably separate from each other and form a cell therebetween in response to the exterior layers being laterally separated. In one aspect, the layers of the paired intermediate layers are spaced and separated from each other by a relatively small distance in comparison to the distance separating the paired intermediate layers. According to one aspect of the multi-layered fabric, the first and second, exterior layers have a more open weave and permit more light transmission than each of the first and second intermediate layers.

In one embodiment, a covering for an architectural opening is disclosed which includes a roller; a bottom rail; and a multi-layered fabric, wherein a first end of each of the front or first exterior and back or second exterior layers of the multi-layered fabric are associated with the roller and a second end of at least one of the first exterior layer and second exterior layer are associated with the bottom rail. In one embodiment, one or both of the exterior layers forms a sheer sheet configured to permit light to transmit therethrough, and preferably, the first, second or a combination of the first and second intermediate layers (the paired middle layer) blocks the transmission of light therethrough.

In another embodiment, a method of forming a multi-layered fabric is disclosed that includes the steps of: weaving first and second exterior layer of a multi-layered fabric; weaving in a first region a fifth warp sheet and a seventh warp sheet with warp sheets of the first exterior layer; weaving in a second region a sixth warp sheet and the fifth warp sheet with warp sheets of the first exterior layer; weaving first and second intermediate layers of the multi-layered fabric; weaving in a first region of the second exterior layer the seventh warp sheet and the eighth warp sheet with the warp sheets of the back layer; and weaving in a second region of the back layer the sixth warp sheet and the eighth warp sheet with the warp sheets of the second exterior layer. The method, in an embodiment, may include cutting a first set of warp sheets at a first location. The method in one aspect may further include cutting a second set of sheets at a second location different than the first location. The cutting according to one aspect may be performed during the weaving process.

In another embodiment, a method of making a multi-layered fabric is disclosed that includes the steps of: weaving warp sheets together to form first and second exterior layers of a multi-layered fabric; weaving warp sheets together to form first and second intermediate layers of the multi-layered fabric; weaving warp sheets together in a first region; and weaving a different combination of warp sheets together in a second region. The method in one aspect may further include weaving yet a different and smaller subset of warp sheets together in a third region and a fourth region, and weaving a still further subset of warp sheets together in a fifth region and a sixth region. Other combinations and different amount of layers are contemplated for the multi-layered fabric and its method of manufacture.

BRIEF DESCRIPTION OF THE DRAWINGS

The various aspects, features, and embodiments of a multi-layered fabric, its structure, method of manufacture, and its use as an architectural covering as disclosed herein will be better understood when read in conjunction with the drawings provided. Embodiments are provided in the drawings for the purposes of illustrating aspects, features, and/or various embodiments of the multi-layered fabric and architectural covering, but the claims should not be limited to the precise arrangement, structures, subassemblies, features, embodiments, aspects, and devices shown, and the arrangements, structures, subassemblies, features, embodiments, aspects, and devices shown may be used singularly or in combination with other arrangements, structures, subassemblies, features, embodiments, aspects, and devices. The drawings are not necessarily to scale and are not in any way intended to limit the scope of the claims, but are merely presented to illustrate and describe various embodiments, aspects and features of the multi-layered fabric or structure, its method of manufacture, and its use as an architectural covering to one of ordinary skill in the art.

FIG. 2A is a side view of one embodiment of a multi-layer fabric in an expanded condition.

FIG. 2B is a side view of one embodiment of a multi-layer fabric in a collapsed condition, and in the condition of manufacture.

DETAILED DESCRIPTION OF THE DISCLOSURE

Figure 1:
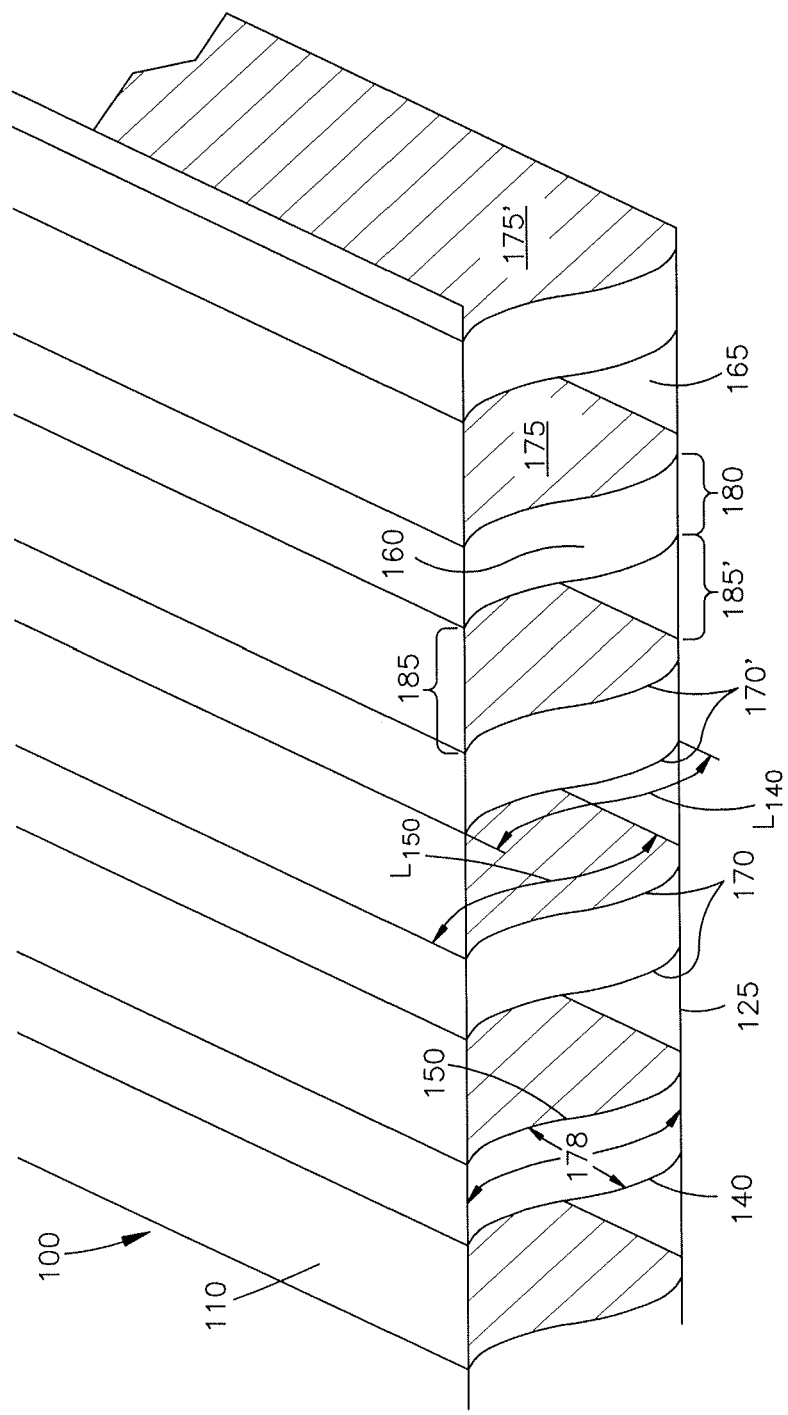
FIG. 1 is a side perspective view of a multi-layer fabric in an expanded condition.

In the following detailed description, numerous details are set forth in order to provide an understanding of the multi-layered fabric, its method of manufacture and its use as an architectural covering. However, it will be understood by those skilled in the art that the different and numerous embodiments of the multi-layered structure, its method of manufacture, and its use as an architectural covering may be practiced without these specific details, and the claims and invention should not be limited to the embodiments, subassemblies, specified features, processes, methods, or details specifically described and shown herein. The description provided herein is directed to one of ordinary skill in the art and in circumstances, well-known methods, procedures, manufacturing techniques, components, and assemblies have not been described in detail so as not to obscure other aspects, or features of the multi-layered fabric, its method of manufacture or its use as an architectural covering.

Accordingly, it will be readily understood that the components, aspects, features, elements, manufacturing techniques, processes, and subassemblies of the embodiments, as generally described and illustrated in the figures herein, can be arranged and designed in a variety of different configurations in addition to the described embodiments. It is to be understood that the multi-layered fabric and covering may be used with many additions, substitutions, or modifications of form, structure, arrangement, proportions, materials, components, and manufacturing techniques which may be particularly adapted to specific environments and operative requirements without departing from the spirit and scope of the invention. The following descriptions are intended only by way of example, and simply to illustrate certain selected embodiments of a multi-layered fabric and its method of manufacture. For example, while the multi-layered fabric may be shown and described as having two intermediate layers, it will be understood that the intermediate layer may be formed of or comprise more or fewer layers. In addition, while the architectural covering may be described in examples with particular reference to its use as a window covering to control light, shading, privacy, and view-through, it should be understood that the multi-layered fabric or covering has other applications as well. The claims appended hereto will set forth the claimed invention and should be broadly construed to cover multi-layered fabrics, methods of manufacture, multi-layered panels, architectural coverings, and modes of operation, unless otherwise clearly indicated to be more narrowly construed to exclude embodiments, elements and/or features of the multi-layered fabric, panels, coverings, manufacturing techniques, and/or modes of operation.

Throughout the present application, reference numbers are used to indicate a generic element or feature of the multi-layered fabric, covering, or manufacturing technique. The same reference number may be used to indicate elements or features that are not identical in form, shape, structure, etc., yet which provide similar functions or benefits. Additional reference characters (such as letters, primes, or superscripts, as opposed to numbers) may be used to differentiate similar elements or features from one another. It should be understood that for ease of description the disclosure does not always refer to or list all the components of the multi-layered fabric, panel, covering, or all the steps in the manufacturing techniques. It should also be understood that for ease of description a singular reference to an element, member, or structure, e.g., a singular reference to a layer, warp sheet, support member, a vane, etc., may be a reference to one or more such elements, unless the context indicates otherwise.

In the following description of various embodiments of the multi-layered fabric, panel, or architectural covering, it will be appreciated that all directional references (e.g., proximal, distal, upper, lower, upward, downward, left, right, lateral, longitudinal, front, face, rear, back, top, bottom, above, below, vertical, horizontal, radial, axial, interior, exterior, clockwise, and counterclockwise) are only used for identification purposes to aid the reader's understanding of the present disclosure unless indicated otherwise in the claims, and do not create limitations, particularly as to the position, orientation, or use in this disclosure. Features described with respect to one embodiment typically may be applied to another embodiment, whether or not explicitly indicated.

Connection references (e.g., attached, coupled, connected, joined, and stitched) are to be construed broadly and may include intermediate members between a collection of elements and relative movement between elements unless otherwise indicated. As such, connection references do not necessarily infer that two elements are directly connected and/or in fixed relation to each other. Identification references (e.g., primary, secondary, first, second, third, fourth, etc.) are not intended to connote importance or priority, but are used to distinguish one feature from another. The drawings are for the purpose of illustration only and the dimensions, positions, order and relative sizes reflected in the drawing may vary.

The disclosure relates to multi-layered fabrics, and their methods of manufacture. The multi-layer fabric may have many uses including as a covering for an architectural opening, e.g., windows, archways and the like. The coverings are particularly useful for windows to provide an aesthetic look, desirable shading, and privacy. The multi-layered fabric may have other uses, e.g., as room dividers, partitions, screens, and/or filters. Other uses are contemplated for the multi-layer fabrics described herein.

In one embodiment, a multi-layered fabric is disclosed that includes a front or first exterior layer; a back or second exterior layer; at least one and preferably a plurality of first interior or intermediate layers extending between the front and back layer; and at least one and preferably a plurality of second interior or intermediate layers extending between the first and second exterior layers, the second intermediate layer preferably being separate from the first intermediate layer. In an aspect, the second intermediate layer preferably is paired with the first intermediate layer to form paired intermediate layers, preferably a plurality of paired intermediate layers. Each layer of the paired intermediate layers may be separated from but preferably proximate to the other layer of the paired intermediate layers. In an aspect, the paired intermediate layers are in close proximity to each other, and portions of each are stitched, e.g., weaved, with at least one of the first (front) exterior layer and the second (back) exterior layer.

The first intermediate layer in the multi-layered fabric in an embodiment is weaved with the first exterior layer at different locations or regions than the locations or regions that the second intermediate layer is weaved with the first exterior layer. In this manner, the first intermediate layer may be connected to, and, in embodiments, also not connected to, the first exterior layer at different locations or regions than the second intermediate layer is connected to, and also not connected to, the first exterior layer. The first intermediate layer of the multi-layered fabric in one embodiment may be weaved with the second exterior layer such that it is connected to, and in embodiments also not connected to, the second exterior layer at different locations or regions than the locations or regions that the second intermediate layer is weaved with the second exterior layer.

The multilayer fabric in embodiments has a plurality of paired intermediate layers that include a first intermediate layer and a second intermediate layer. In one embodiment, the multi-layered fabric comprises a plurality of first intermediate layers and a plurality of second intermediate layers, and proximate first and second intermediate layers form paired intermediate layers or paired middle layers. The first intermediate layer of the paired middle layers preferably extends from at least one of the first and second exterior layers at a different location than the second intermediate layer of the paired intermediate layers extends from at least one of the first and second exterior layers. In embodiments, the first intermediate layer of the paired middle layers preferably extends from at least the other of the first and second exterior layers at a different location than the second intermediate layer of the paired middle layers extends from at least the other of the first and second exterior layers.

The paired intermediate or middle layers preferably separate and form a cell therebetween in response to the exterior layers being laterally separated. In an embodiment, the multilayered fabric has a plurality of first intermediate layers and a plurality a second intermediate layers wherein proximate first and second intermediate layers form paired middle layers, wherein the first intermediate layer of said paired middle layer extends from at least one of the first and second exterior layers at a different location than the paired second intermediate layer extends from said at least one of the first and second exterior layers, wherein the paired middle layers separate from each other and form a cell therebetween in response to the exterior layers being laterally separated. In one embodiment, The weaving of the first and second intermediate layers together form a layer of fabric that completely encircles a space to form an elongated tube-like structure with open ends.

Each first exterior layer and second exterior layer in an embodiment may be formed from at least two warp sheets, and in embodiments may be formed of three or more warp sheets. Each of the first and second intermediate layers according to an aspect of the multi-layered fabric may be formed from at least two warp sheets, and in embodiments may be formed of three or more warp sheets. According to one aspect, each of the first and second intermediate layers are separate from both the first exterior and second exterior layers for a length and wherein the separate length of the first intermediate layer is the same as the separate length of the second intermediate layer.

In one embodiment of the multi-layered fabric, the first intermediate layer may be stitched to at least one of the first and second exterior layers for a distance as small as one eighth (⅛) of an inch to as large as three eighths (⅜) of an inch, and may vary therebetween in increments of one sixteenth (1/16) of an inch. Alternatively, or additionally, the second intermediate layer may be stitched to the other of the first and second exterior layers for a distance as small as one eighth (⅛) of an inch to as large as three eighths (⅜) of an inch, and may vary therebetween in increments of one sixteenth (1/16) of an inch. According to one embodiment, the first intermediate layer may separate from the first exterior layer at a different location than the second intermediate layer separates from the first exterior layer. The first intermediate layer in an embodiment may separate from the second exterior layer at a different location than the second intermediate layer separates from the second exterior layer. According to one aspect of the multi-layered fabric, the first and second exterior layers have a more open weave and permit more light transmission than one or each of the first and second intermediate layers.

In one embodiment, a covering for an architectural opening is disclosed which includes a roller; a bottom rail; and a multi-layered fabric, the multi-layered fabric having a front or first exterior layer and a back or second exterior layer wherein a first end of each of the front or first exterior layer and the back or second exterior layer of the multi-layered fabric are associated with the roller and a second end of at least one of the first exterior layer and the second exterior layer are associated with the bottom rail. The multi-layered fabric according to an embodiment further includes a plurality of first intermediate layers extending between the front and back layer; and at least one and preferably a plurality of second intermediate layers extending between the first and second exterior layers, the second intermediate layers being separate from the first intermediate layers. The first intermediate layer in the multi-layered fabric may be weaved together with at least one of the first exterior layer and second exterior layer at a different location than the location at which the second intermediate layer is weaved together with the at least one first exterior layer and second exterior layer. The first intermediate layer of the multi-layered fabric in one embodiment may be weaved together with at least the other of the first exterior layer and the second exterior layer at a different location than the location at which the second intermediate layer is weaved together with the at least one of the first exterior layer and second exterior layer.

In one aspect, a covering is disclosed wherein further rotation of the roller after the multi-layered fabric is unwrapped from the roller laterally separates the first exterior layer from the second exterior layer and further separates the first intermediate layer from the second intermediate layer to form a cell between the first and second intermediate layers. In one embodiment, a first intermediate layer is separate from and proximate to a second intermediate layer to form paired intermediate layers, also referred to as cellular vanes. The paired intermediate layers or cellular vanes are separated from each other along the length of the exterior layers. In one embodiment, the spacing between the intermediate layers forming the paired intermediate layers or cellular vanes is smaller, preferably substantially smaller, than the spacing between the adjacent paired intermediate layers (cellular vanes). In an embodiment, the spacing between the intermediate layers forming the paired intermediate layers (e.g., cellular vanes) is one (1) to twelve (12) times smaller, preferably four (4) to eight (8) times smaller, than the spacing between adjacent paired intermediate layers (cellular vanes). The first exterior layer in an embodiment of the covering forms a sheer sheet which permits light to transmit there through, the second exterior layer forms a sheer sheet which permits light to transmit there through, and at least one of the first and second intermediate layers substantially or completely blocks the transmission of light there through. In other words, the first and second exterior layers preferably have a higher light transmitivity than at least one and preferably both of the intermediate layers.

In another embodiment, a method of forming a multi-layered fabric is disclosed that includes the steps of: weaving a first exterior layer of a multi-layered fabric having at least a first and second warp sheet; weaving a second exterior layer of a multi-layered fabric comprising at least a third and fourth warp sheet; weaving in a first region a fifth warp sheet and a seventh warp sheet with the first and second warp sheets of the first exterior layer; weaving in a second region a sixth warp sheet and the fifth warp sheet with the first and second warp sheets of the first exterior layer; weaving a first intermediate layer of a multi-layered fabric from the seventh warp sheet from the first region and an eighth warp sheet; weaving a second intermediate layer of a multi-layered fabric from the fifth warp sheet and the sixth warp sheet; weaving in a first region of the second exterior layer the seventh warp sheet and the eighth warp sheet with the third and fourth warp sheets of the back layer; and weaving in a second region of the back layer the sixth warp sheet and the eighth warp sheet with the third and fourth warp sheets of the second exterior layer.

Weaving the first intermediate layer in one aspect includes, and in another aspect consists essentially of, weaving the seventh warp sheet and the eighth warp sheet together. In another embodiment, the second intermediate layer includes, and in another aspect consists essentially of, weaving the fifth warp sheet and the seventh warp sheet together. In another embodiment, the first intermediate layer comprises additional warp sheets. In another embodiment, the second intermediate layer comprises additional warp sheets. In yet other embodiments, the first and second regions of the first exterior layer comprises additional warp sheets. In different embodiments, the front and second regions of the second exterior layer comprises additional warp sheets.

The first region of the first exterior layer in one embodiment includes, and in an aspect consists essentially of, the first and second warp sheets of the first exterior layer, the fifth warp sheet, and the seventh warp sheet. The second region of the first exterior layer in another embodiment includes, and in an aspect consists essentially of, the first and second warp sheets of the first exterior layer, the fifth warp sheet, and the sixth warp sheet. The first region of the second exterior layer in an embodiment includes, and in an aspect consists essentially of, the third and fourth warp sheets of the second exterior layer, the seventh warp sheet, and the eighth warp sheet. The second region of the second exterior layer in an embodiment includes, and in an aspect consists essentially of, the third and fourth warp sheets of the second exterior layer, the sixth warp sheet, and the eighth warp sheet.

The method, in an embodiment, includes cutting the fifth warp sheet and the seventh warp sheet at a first location. The method in an aspect further includes cutting the sixth warp sheet and the eighth warp sheet at a second location. The method according to one aspect includes cutting the fifth and seventh warp sheets at a first location, and cutting the sixth and eighth warp sheets at a second location, wherein the first location is different from the second location. The cutting according to one aspect is performed during, and in another aspect immediately after, the weaving process.

In another embodiment, a method of making a multi-layered fabric is disclosed that includes the steps of: weaving at least a first warp sheet and a second warp sheet together to form a first exterior layer of a multi-layered fabric; weaving a third warp sheet and a fourth warp sheet together to form a second exterior layer of a multi-layered fabric; weaving a fifth warp sheet and a sixth warp sheet together to form a first intermediate layer of a multi-layered fabric; weaving a seventh warp sheet and an eighth warp sheet together to form a second intermediate layer of a multi-layered fabric; weaving the first, second, fifth, sixth, seventh, and eighth warp sheets together in a first region; and weaving the third, fourth, fifth, sixth, seventh, and eighth warp sheets together in a second region. The weaving of the different warp sheets in a region preferably couples the warp sheets, and as appropriate the different layers. The regions may be as small as one eighth (⅛) of an inch to as large as three eighths (⅜) of an inch, and may vary therebetween in increments of one sixteenth (1/16). The regions may be larger or smaller and preferably are sufficient to provide appropriate tightness of the warp sheets in the regions for the desired purpose of the multi-layered fabric.

The method in one aspect further includes weaving the first, second, fifth and sixth warp sheets together in a third region and a fourth region. In one embodiment, the third and fourth regions are adjacent to the first region. According to another aspect, the method includes weaving the third, fourth, seventh and eighth warp sheets together in a fifth region and a sixth region. The fifth and sixth regions in one aspect are adjacent to the second region.

Referring to FIGS. 1 and 2A-B, multi-layered fabric 100 generally has a first exterior (surface) layer 110 and second exterior (surface) layer 125. The first exterior layer may also be referred to as a top or front layer and the second exterior layer may be referred to as a bottom, rear, or back layer. The multi-layered fabric may have one and preferably a plurality of interior, middle, or intermediate layers. The intermediate or middle layers in an embodiment extend between, and in an aspect are coupled to (e.g., joined by weaving stitches), the first exterior and second exterior layers 110, 125. In one aspect, the intermediate layers 140 are shorter than the first exterior layer 110 and/or shorter than the second exterior layer 125. In one embodiment, the intermediate layers are shorter than both the first and second exterior layers 110, 125. In one aspect, the intermediate layers are coupled directly to, and weaved at selected regions with the exterior layers. In one embodiment, there are a plurality of intermediate layers that extend between the first and second exterior layers in corresponding paired intermediate layers 140, 150. It will be appreciated that the multilayered fabric in an embodiment has a plurality of paired intermediate layers.

Figure 7A:
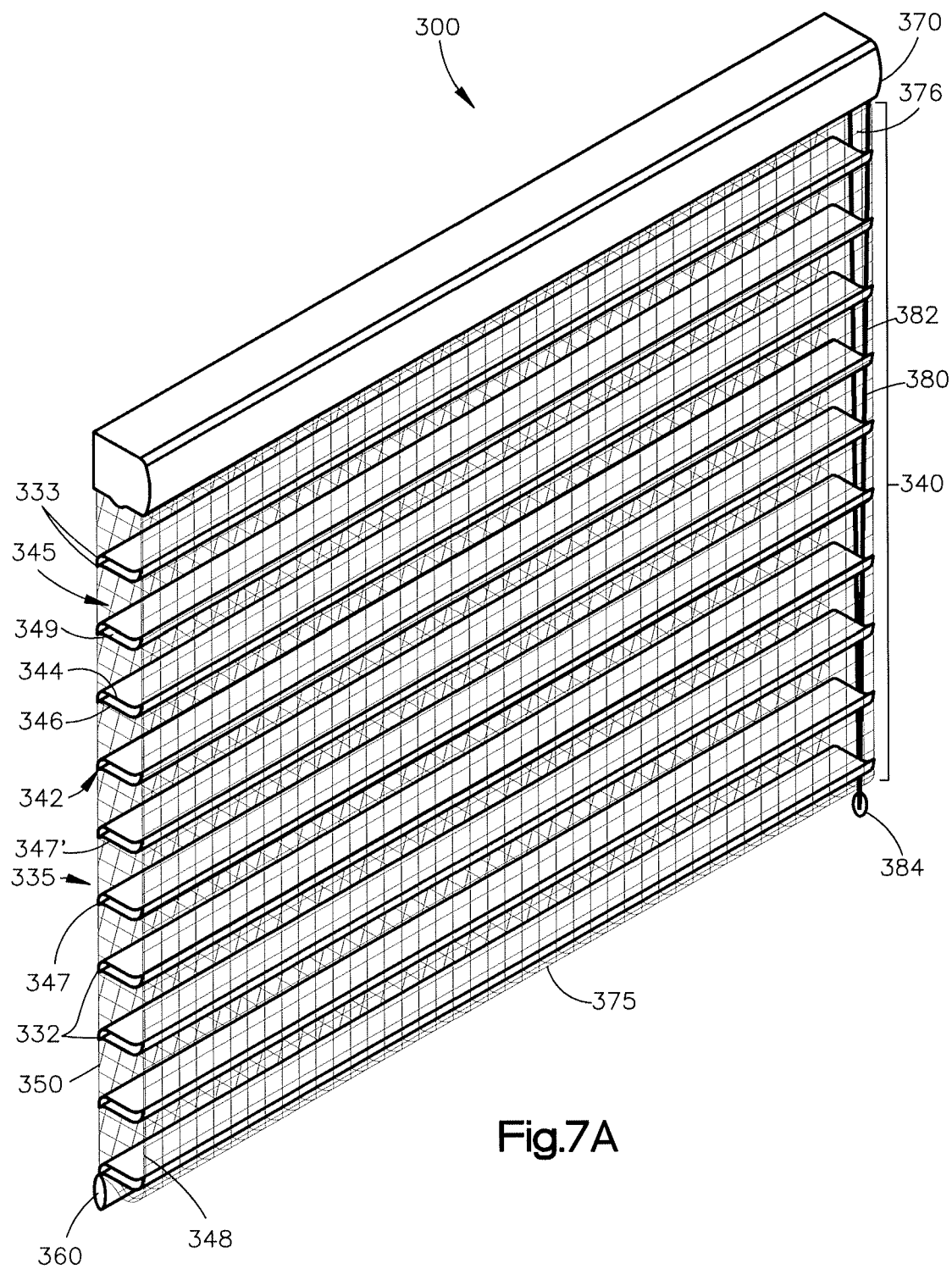
FIG. 7A is a side perspective view of a covering for an architectural feature in accordance with one embodiment where a panel formed from a multi-layered fabric is in an expanded condition.
Figure 7B:
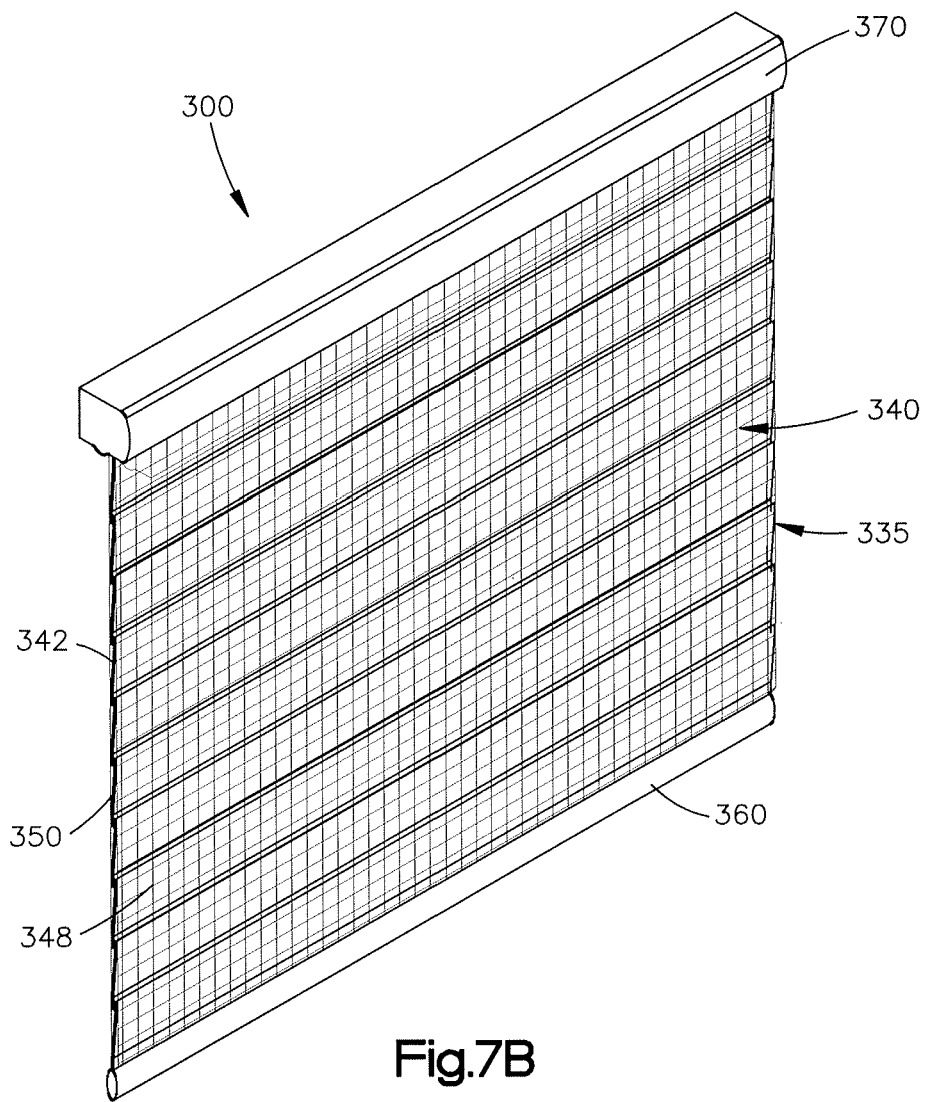
FIG. 7B is a side perspective view of a covering for an architectural feature in accordance with one embodiment where a panel formed from a multi-layered fabric is in a closed condition.

The multi-layered fabric in an embodiment forms a flexible panel or subassembly 335, which may form part of a covering 300 as shown in FIGS. 7A and 7B. When the multi-layered fabric is used as a panel in a covering, the plurality of intermediate layers in an embodiment are paired to form a plurality of paired middle layers, which are preferably shorter than, extend between, and in one aspect are coupled to and/or weaved together with the first exterior and second exterior layers to form vanes or slats as described below in reference to FIGS. 7A and 7B. In an aspect, the intermediate layers have a length extending from one exterior layer to the other exterior layer and in exemplary embodiments the length is as small as half an inch to as large as five inches, preferably between two (2) to four (4) inches in length, although other lengths are contemplated.

Figure 5:
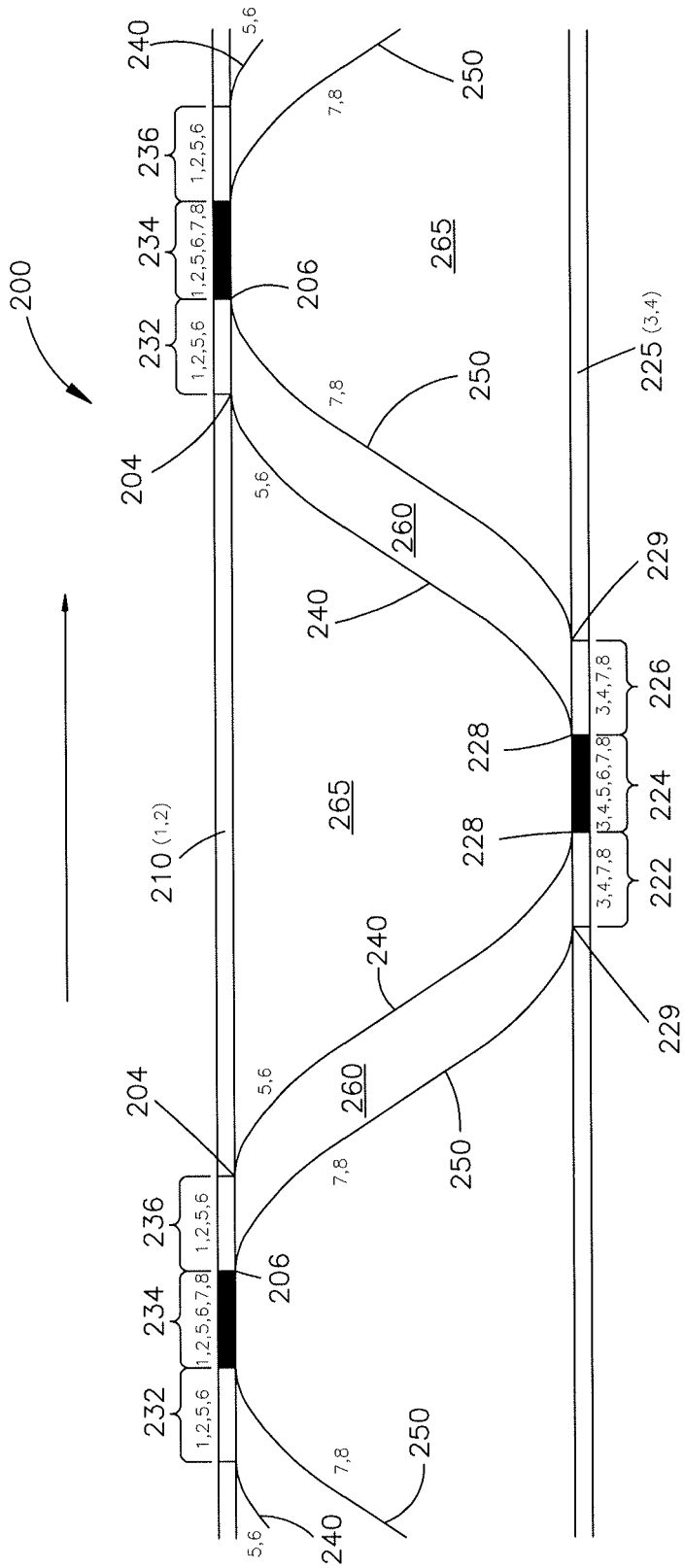
FIG. 5 is a side view of an embodiment of a multi-layered fabric in an expanded condition.

The multi-layer fabric may have a collapsed and expanded configuration. In the collapsed configuration, as shown in FIG. 2B and FIG. 7B, the layers of the multi-layer fabric are generally adjacent and parallel to each other. In the expanded configuration, as shown in FIGS. 1, 2A and 5, the front and back layers, also referred to as first exterior and second exterior layers, are generally parallel (preferably without creases or fold lines) and the intermediate layers extend between and are angularly oriented with respect to the front and back layers. Movement, both laterally and vertically, of the front and back layers relative to each other expands or collapses the multi-layered fabric and controls the angular orientation of the plurality of intermediate layers, e.g., vanes in the context of a covering. Adjusting the angular orientation of the intermediate layers, e.g., the vanes in the context of a covering, may vary the view-through and opacity of the multi-layered fabric or covering.

In one embodiment, the intermediate layers may be paired together and preferably the paired intermediate or middle layers separate from each other and form cells 160, 260 between the paired middle layers in the expanded configuration as shown in FIGS. 1 and 2A. In the context of a covering, these paired intermediate layers may be referred to as cellular vanes. The paired intermediate layers are separate but proximate to each other. In an embodiment, the paired middle layers together form a continuous wall that in response to the exterior layers being laterally separated, the paired middle layers separate to circumscribe or surround a cell 160 to form a generally tube-like structure with open ends. For example, the materials forming the two intermediate layers (e.g., the yarns) of the paired intermediate/middle layers forming the cellular vanes circumscribe a space as illustrated by 178 in FIG. 1. In an aspect, a plurality of paired middle layers form a plurality of horizontal tube-like structures that are connected laterally along and spread out along the exterior layers to form adjacent tube-like structures.

In one embodiment, as shown in FIGS. 1 and 2A, the tube-like structures are spaced out along the exterior layers so that adjacent tube-like structures form cavities 165, 265 between adjacent paired middle layers in response to the exterior layers being laterally separated. In one embodiment, the relative distance between the intermediate layers that form a paired intermediate layer (or cellular vane) is relatively close compared to the distance separating the paired intermediate layers (or cellular vanes). The distance 180 between first and second intermediate layers forming a paired combination is generally less than half an inch (½") for intermediate layers having a length of about three inches (3"), while the distance 185 between adjacent paired combinations is larger, preferably twice as large or larger, and generally approximately the length of, and preferably less than the length of, the intermediate layers, e.g., a little less than three (3) inches for intermediate layers having a length of three (3) inches.

Figure 3A:
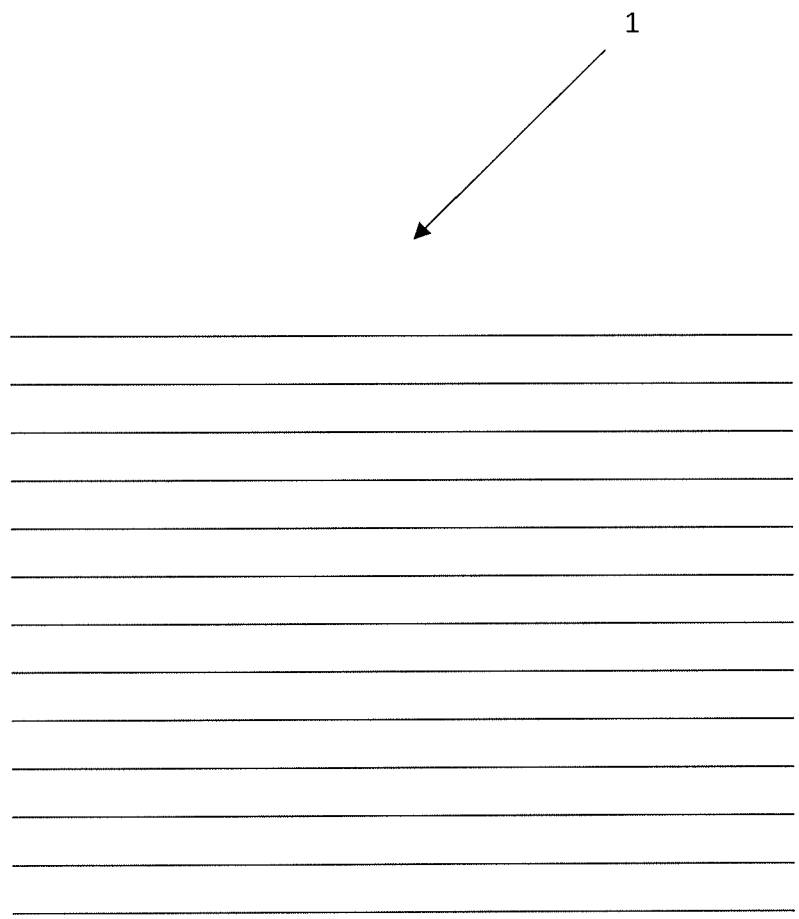
FIG. 3A is a top view schematic illustration of warp yarns forming a warp sheet.
Figure 3B:
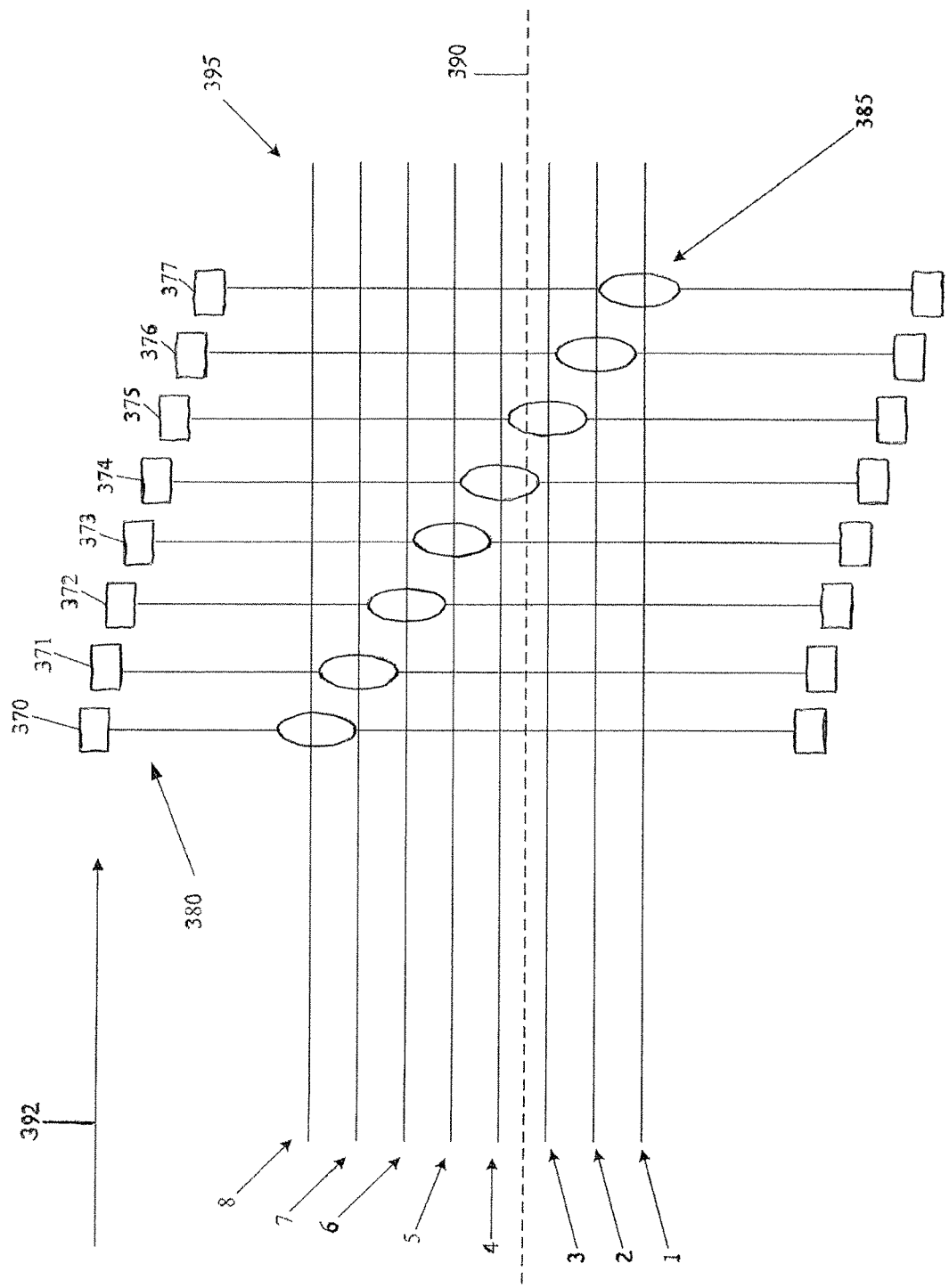
FIG. 3B is a schematic representation of warp sheets used to make a multi-layered fabric.

Each of the exterior layers and the interior layers of the multi-layered fabric, in one embodiment, are formed by a weaving process to be described herein. Each layer undergoes a weaving process, and the multi-layered fabric preferably is formed from a process that in one embodiment continuously weaves the layers and interconnects (e.g., weaves) portions of the layers together as will be described. In one embodiment, each layer is formed of at least two warp sheets. A warp sheet is a plurality of yarns that are generally side-by-side and parallel as shown in FIG. 3A. The number of yarns in the warp sheet depends upon the required fabric width and the warp thread density or warp density (defined as number of warp yarns per unit length, e.g., threads/inch). Warp sheets 1, 2, 3, 4, 5, 6, 7, and 8 as shown in FIG. 3B are weaved to form fabric 395. More (or less) warp sheets may be used to form each layer of fabric. Each warp sheet 1, 2, 3, 4, 5, 6, 7, and 8 is assigned to (e.g., controlled by) a harness 370, 371, 372, 373, 374, 375, 376, and 377 of the weaving machine. A harness is the part of the weaving machine that handles a warp sheet that is formed of a plurality of yarns, and controls the warp sheet (yarns) up and down movements to weave or interlace the warp sheets (plurality of yarns) with weft yarns. The harnesses generally include Heddle wire 380 and each heddle wire possesses a Heddle eye 385. In FIG. 3B the harnesses 370, 371, 372, 373, 374, 375, 376, and 378 and warp sheets 1, 2, 3, 4, 5, 6, 7, and 8 are shifted from centerline 390 for clarity. The warps sheets 1, 2, 3, 4, 5, 6, 7, and 8 are fed into the weaving machine in the direction of arrow 392 in FIG. 3B. Weft yarns generally are oriented at an angle to the warp yarns and traverse or cross the warp yarns. In an embodiment, the weft yarns are perpendicular to the warp yarns. The weft yarns in an aspect are inserted one by one in sequence. The weft yarns for clarity are not shown in FIGS. 3A and 3B.

In one embodiment, the weave of each of the four layers is a plain weave (e.g., 1×1 weave) or a plain weave derivative (such as a warp rib, a filling rib, and a basket weave). Each of the first exterior layer 110 and the second exterior layer 125 may be woven in low tightness (open or scrim-like structure) to form a sheer fabric which allows the passage or transmission of light. The open woven structure or sheer fabric layer may be attained by configuring warp and weft yarn sizes, warp and weft thread densities (thread density is defined as number of threads/unit fabric length), warp and weft spacing, and weave structure. That is, the warp yarns and weft yarns are loosely spaced to create openings therebetween that permit light to pass through. The two intermediate layers 140, 150 may be woven much tighter than the first exterior layer 110 and the second exterior layer 125. The degree of tightness of the two intermediate layers 140, 150 can be controlled through selection of warp and weft yarn sizes, warp and weft thread densities, additional warp sheets, warp and weft spacing, and weave structure.

FIG. 2A shows a schematic illustration of the side view (fabric thickness view) of an embodiment of a multi-layer fabric 100 having four layers made from eight (8) warp sheets denoted 1, 2, 3, 4, 5, 6, 7, and 8. The arrow in each of FIGS. 2A and 2B indicates the direction of the warp sheet, which is the direction that the yarns are fed into the loom (weaving machine) during the weaving process. Fabric 100 is made by repeating a stitching or weaving pattern during the weaving process. Multi-layered fabric 100 preferably is made from a continuous weaving process. The weaving process proceeds to form many repeating units, cycles, or cells to form a large panel or multi-layered fabric structure. For example, a plurality of paired intermediate layers may be created to form a plurality of paired middle layers that may form a plurality of horizontal tube-like structures which are spaced along the exterior layers. The weaving process may create a large panel that may thereafter be cut to form multiple panels, or the weaving process may be used to create a custom size panel of predetermined length and width.

FIG. 2A shows one complete repeat cycle or pattern (cell), a portion of the preceding cycle or pattern on the left, and a portion of the following cycle or pattern on the right, to provide a better understanding of the structure of the multi-layered fabric 100 and how the multi-layered fabric 100 is formed. In this regard, FIG. 2A shows intermediate layers 140, 150 forming a paired middle layer 170 that forms a horizontal tube 175 that comprises a continuous wall 178 formed of the intermediate layers to create a first cell 160, and additionally a second cavity 165 formed by the adjacent horizontal tubes 175, 175' or paired middle layers 170, 170' and the exterior layers 110, 125. In one embodiment, the distance 185 between adjacent paired intermediate layers is greater, and in embodiments greater than double the distance or more (and may be greater than one, two, three, or four times), than the spacing 180 between the intermediate layers forming the paired intermediate layers or cellular vanes, and yet the spacing 180 between the adjacent intermediate layers forming the paired intermediate layers or cellular vanes is sufficient to maintain a cellular space 160 between the paired intermediate layers.

While the layers and warp sheets are illustrated as a line in FIG. 2A, it should be appreciated that the layers and sheets are two dimensional sheets formed of multiple warp and weft yarns. In the weaving process, the face layer 110 is woven from warp sheets 1 and 2 by interlacing them with weft (not shown), the back layer 125 is woven from warp sheets 3 and 4 by interlacing them with weft (not shown), the first intermediate layer 140 is woven from warp sheets 5 and 6 by interlacing them with weft (not shown), and the second intermediate layer 150 is woven from warp sheets 7 and 8 by interlacing them with weft (not shown). In the following sections, when two or more warp sheets are woven or stitched together it means that the warp sheets are woven or stitched by interlacing them with weft yarns, where the phrase "by interlacing with weft" is omitted. The phrase "not woven" indicates that the warp sheets are not woven (interlaced) with weft yarns.

As shown in FIG. 2A, the warp sheets 1, 2, 3, 4, 5, 6, 7, and 8 are woven and/or interconnected together at different locations and with different warp sheets during the weaving process to form the multi-layered fabric. More particularly, warp sheets 1, 2, which form the front layer 110, are woven with the warp sheets 5, 6, 7, and 8 at certain locations (portions) and in certain arrangements, and the warp sheets 3, 4, which form the back layer 125, are woven with warp sheets 5, 6, 7, and 8 at different locations (portions) and in certain arrangements as will be described to form an embodiment of a multi-layered fabric. The warp sheets 5, 6, 7 and 8 that form the interior or intermediate layers 140, 150 may be connected by woven stitches to the warp sheets 1 and 2 that form the front layer 110 and then separated from the warp sheets 1 and 2 that form the front layer 110 at different locations. The warp sheets 5, 6, 7, and 8 that form the intermediate layers 140, 150 may be connected by woven stitches to the warp sheets 3 and 4 of the back layer 125 and then separated from the back layer 125, e.g., warp sheets 3 and 4, at different locations during the weaving process to form the multi-layered fabric. Accordingly, in an embodiment, the weaving process is a repeating process. It should be noted that while weaving, the warp sheets of the front layer 110, the back layer 125, and the two intermediate layers 140 and 150 are very close to (and may be touching) each other (i.e., the cells are collapsed) as shown schematically in FIG. 2B.

In FIG. 2A, during the weaving process starting from the left, warp sheets 1, 2 are woven together (with weft), warp sheets 3, 4 are woven together (with weft), warp sheets 5, 6 are woven together (with weft), and warp sheets 7, 8 are woven together (with weft) to form separate layers, namely, front layer 110, back layer 125, intermediate layer 140, and intermediate layer 150, respectively. In region 120, shown at the bottom of FIG. 2A, warp sheets 3, 4, 7, 8 are all woven (stitched) together. The two warp sheets 5 and 7 shown in dotted line in FIG. 2A preceding portion 120, separate from the back layer 125, are not woven with weft, and are directed toward and extend to warp sheets 1, 2 of the front layer 110, and then are woven with warp sheets 1, 2 of the front layer 110 in the region 130 shown at the top of FIG. 2A. The two warp sheets 5, 7 are cut during weaving or post weaving as described below. The two warp sheets 6 and 8 are woven (stitched) with warp sheets 3 and 4 of the back layer 125 in the region 122 shown at the bottom of FIG. 2A, then warp sheets 6, 8 shown in dashed line in FIG. 2A are separated from the back layer 125, are not woven with weft, and are directed toward and extend to the front layer 110.

The length of the front layer that is woven from warp sheets 1, 2 only, and the length of the back layer that is woven from warp sheets 3, 4 only, defines the distances 185, 185' (shown in FIG. 1) between adjacent paired intermediate layers 140, 150. The woven length from the warp sheets 1, 2 alone, and the woven length from the warp sheets 3,4 alone, can be the same between regions 120, 124, 132, and 136, or can vary between adjacent regions to change the distances 185, 185' between adjacent paired intermediate layers 140, 150.

After regions 122 and 130 are woven, warp sheet 7 is separated from the front layer 110 (warp sheets 1, 2) and woven with warp sheet 8 for a distance to form the intermediate layer 150. Meanwhile, warp sheets 5 and 6 of the intermediate layer 140 are woven with warp sheets 1 and 2 of the front layer 110 in the region 132 shown at the top of FIG. 2A. Warp sheets 7 and 8 are woven together as a separate layer 150 for a desired length $L_{150}$ (see FIG. 1). The length $L_{150}$ of layer 150 can be any desired length and may depend upon the desired characteristics, size, and contemplated use of the resulting multi-layered fabric.

After region 132, warp sheets 5 and 6 are separated from the front layer 110 and woven together for a distance (length) to form the intermediate layer 140 for a desired length $L_{140}$ (see FIG. 1). The length $L_{140}$ of layer 140 can be any desired length and may depend upon the desired characteristics, size, and contemplated use of the resulting multi-layered fabric. Preferably warp sheets 5 and 6 are woven together to form intermediate layer 140 which has the same length as layer 150. While the length $L_{150}$ that warp sheets 7, 8 are woven to form intermediate layer 150 may be the same as the length $L_{140}$ that warp sheets 5, 6 are woven to form intermediate layer 140, it is contemplated that length $L_{150}$ may be more or less than length $L_{140}$ and that this variation in lengths $L_{140}$ and $L_{150}$ may affect the size and shape of any cell formed between the paired intermediate layers, and within, and upon opening or expanding, the multi-layered fabric 100. In one embodiment, the length L that the warp sheets are woven to form the intermediate layers may be sized and configured to reduce creasing or worm tracks that may occur during rolling of the multi-layered fabric.

Meanwhile, warp sheets 1, 2 are woven together for a length to form the front layer 110, and warp sheets 3, 4 are woven together for a distance to form back layer 125. Warp sheets 7, 8 then are woven (stitched) with warp sheets 3, 4 of the back layer 125 in the region 124 shown at the bottom of FIG. 2A. Then warp sheets 6 and 8 are woven with the two warp sheets 3 and 4 of the back layer 125 in region 126 shown at the bottom of FIG. 2A.

With this weaving pattern, warp sheets 5, 6 (intermediate layer 140) are coupled to, stitched with, and/or woven together with the warp sheets 1, 2 (front layer 110) in the regions or portions 132, 136. Warp sheets 6, 8 are coupled to, and/or stitched and woven together with warp sheets 3, 4 of the back layer 125 in the regions 122, 126. Warp sheets 5, 7 are coupled to, stitched with, and/or woven together with the warp sheets 1, 2 of the front layer 110 in the regions 130, 134. Warp sheets 7, 8 of the intermediate layer 150 are coupled to, stitched with, and/or woven together with the warp sheet 3, 4 of the back layer 125 in the regions 120, 124 shown at the bottom of FIG. 2A.

The repeating cycle creates regions that contain the same warp sheets woven together. For example, the warp sheets that form region 120 are the same as the warp sheets that form region 124. Likewise, the warp sheets that form region 122 are the same as the warp sheets that form region 126. The warp sheets that form region 130 are the same as the warp sheets that form region 134. In addition, the warp sheets that form region 132 are the same as the warp sheets that form region 136. Regions 120, 122, 124, and 126 are where the warp sheets that form the intermediate layers attach to the back layer 125, while regions 130, 132, 134 and 136 are where the warp sheets that form the intermediate layers attach to the front layer 110. By repeating regions 120, 124; regions 122, 126; regions 130, 134; and regions 132, 136, the weaving process forms a multi-layered fabric having a plurality of intermediate layers that are attached to a first exterior or top layer and a second exterior or back layer, and has a collapsed and expanded configuration where the intermediate layers readily separate and form cells 160 between paired intermediate layers 140, 150 and cells 165 between unpaired adjacent intermediate layers 140, 150 as shown in FIGS. 1 and 2A, and as will be described below.

Representative values for the lengths of regions 120, 122, 124, 126, 130, 132, 134, and 136 may be as small as one eighth (⅛) of an inch and as large as three eighths (⅜) of an inch, and may vary therebetween in increments of about one sixteenth (1/16) of an inch. In one exemplary embodiment, regions 120, 122, 124, 126, 130, 132, 134 and 136 may be about one quarter (¼) of an inch. Other values, larger and smaller, for the length of regions 120, 122, 124, 126, 130, 132, 134, and 136 are contemplated. The length of regions 120, 122, 124, 126, 130, 132, 134, and 136 are preferably long enough to provide a reliable and strong enough connection or tightness of the different warp sheets. The length of regions 120, 122, 124, and 126 may be the same or different. The length of regions 130, 132, 134, and 136 may be the same or different. The length of the regions 130, 132, 134, and 136 may be the same or different than the length of regions 120, 122, 124, and 126. The length of regions 120, 124, 132, and 136 may affect the size and shape of the cell formed between the paired intermediate layers 140 and 150. That is, the length of the regions 120, 124, 132, 136 in an aspect defines the separation distance between the intermediate layers along the respective exterior layers 110, 125. The length of regions 120, 124, 130, 134 corresponds to the spacing 180 between the intermediate layers 140, 150 of paired intermediate layers or cellular vanes. As the length of the regions 120, 124, 132, 136 increase so should the size of the cell 160 formed between the paired intermediate layers 140, 150. The size of the cell 160 affects the light diffusivity as does the length of the intermediate layers and their structure, e.g., yarn density, color, thickness, etc.

Weaving regions 130 and the weaving process (e.g., the weaving of the various warp sheets) in those regions can abut, be adjacent to, spaced from, or overlap region 132 (and the weaving of warp sheets in that region); the weaving process region 134 (and the weaving of warp sheets in that region) can abut, be adjacent to, spaced from, or overlap region 136 (and the weaving of warp sheets in that region); weaving region 120 (and the weaving of warp sheets in that region) can abut, be adjacent to, spaced from, or overlap region 122 (and the weaving of warp sheets in that region); and/or region 124 (and the weaving of warp sheets in that region) can abut, be adjacent to, spaced from or overlap region 126 (and the weaving of warp sheets in that region). Alternatively, or additionally, the weaving regions 120, 122, 124, 126, 130, 132, 134, and 136 can be configured and formed as shown in U.S. published patent application No. US 2014/0138037 to form variously configured cellular vanes.

Unlike in EP 2216 433 A2, where the separation of the intermediate layers from the surface or exterior layers occur at the same points, in the embodiment of FIGS. 2A, and 2B the separation of the two intermediate layers 140, 150 from the front layer 110 are at different locations (points) 104, 106, respectively, which facilitates the formation of a cell, and can control the size and shape of the cell 160 that can form between the two paired intermediate layers 140, 150 as described below. The cell size in an aspect depends on the stiffness of layers 140 and 150 and the height of the cell (e.g., length of region 132), which controls the shape of layers 140 and 150. The stiffness of the layers 140 and 150 can be controlled by their structural parameters (warp and weft yarn sizes, warp and weft yarns materials, warp and weft thread densities, and weave) and the fabric treatment and heat setting parameters post and/or pre weaving. The separation of the two intermediate layers 140, 150 from the back layer 125 in the embodiment of FIGS. 2A and 2B are at different points 128, 129, respectively, which facilitates formation of the cell, and can control the size and shape of the cell 160 that can form between paired intermediate layers 140, 150. The cell size and shape depends upon the stiffness of layers 140, 150 and the height of the cell (e.g. the length of region 124). Having the intermediate layers extend between, and preferably coupled with the exterior layers at different locations facilitates the formation of paired intermediate layers that may advantageously provide improved thermal characteristics (R-value), light diffusion, and aesthetic attributes. In one embodiment, in response to the multi-layered fabric being held vertically, the layers 140 and 150 may be configured and structured to form an S-shape when the multi-layered fabric is expanded.

It should be noted that the warp sheets 5, 7, and 6, 8 as they extend from the face layer 110 to the back layer 125 are not woven and are relatively short. In this regard, the length of the warp sheets 5, 7 and 6, 8 shown in dotted and dashed lines in FIG. 2A is for explanatory purposes and the lengths of the unwoven warp sheets 5, 7 and 6, 8 are relatively short as illustrated in FIG. 2B. The unwoven warp sheets 5, 7 and 6, 8 that extend between the face and back layers 110, 125 will be cut as will be explained below.

To allow the cells 160, 165 to open and close, the warp sheets 5, 7, 6 and 8 in an embodiment are cut. FIG. 2B shows a schematic of a method of cutting the warp sheets 5, 7, 6, and 8. During weaving, warp sheets 5 and 7 are raised at or about location 170 and a fine wire, which has a knife blade at one end, is inserted between the warp sheets 5 and 7 as a first group of warp sheets, and warp sheets 1, 2, 3, 4, 6, and 8 as a second group of warp sheets. Then the formation of the fabric proceeds as described above. After the warp sheets 5 and 7 are secured in the region 130 shown in the top of FIG. 2B, the wire is withdrawn from the fabric and the blade cuts the warp yarns of sheets 5 and 7. The same procedures are followed to cut the warp sheets 6 and 8 where a wire with knife blade is inserted at location 180 between warp sheets 6 and 8 as a first group and warp sheets 1, 2, 3, 4, 5 and 7 as a second group to cut warp sheets 6, 8. The formation of the fabric continues as described above, and after warp sheets 6 and 8 are secured, the wire is withdrawn from the fabric and the blade cuts the warp yarns of sheets 6 and 8. Other methods of cutting warp sheets 5, 7, 6 and 8 are contemplated and the disclosure is not limited to the method described above. During the preparation of the blind, the operator can separate the front layer 110 and the back layer 125 easily by pulling the front layer 110 and the back layer 125 apart from each other. This in an aspect can leave extremely short yarn fringes, which should be parallel to the fabric plane and preferably should not influence the function and/or aesthetic look of the covering.

The cutting process can be performed during or after the weaving process. In one embodiment, warp sheets 5, 7 are cut at location 170 in FIG. 2B after weaving of region 130, after weaving both region 130 and intermediate layers 140 and 150, and/or after weaving the repeating unit. The cutting of warp sheets 5, 7 can occur at other times including after weaving of different regions during the weaving process, after the weaving process, and/or prior to or during manufacture of an architectural covering or other finished product. In one embodiment, warp sheets 6, 8 are cut at location 180 after weaving of region 132, after weaving both region 132 and intermediate layers 140, 150, and/or after weaving the repeating unit. The cutting of warp sheets 6, 8 can occur at other times including after weaving of different regions during the weaving process, after the weaving process, and/or prior to or during manufacture of the architectural covering or other finished product.

Figure 4:
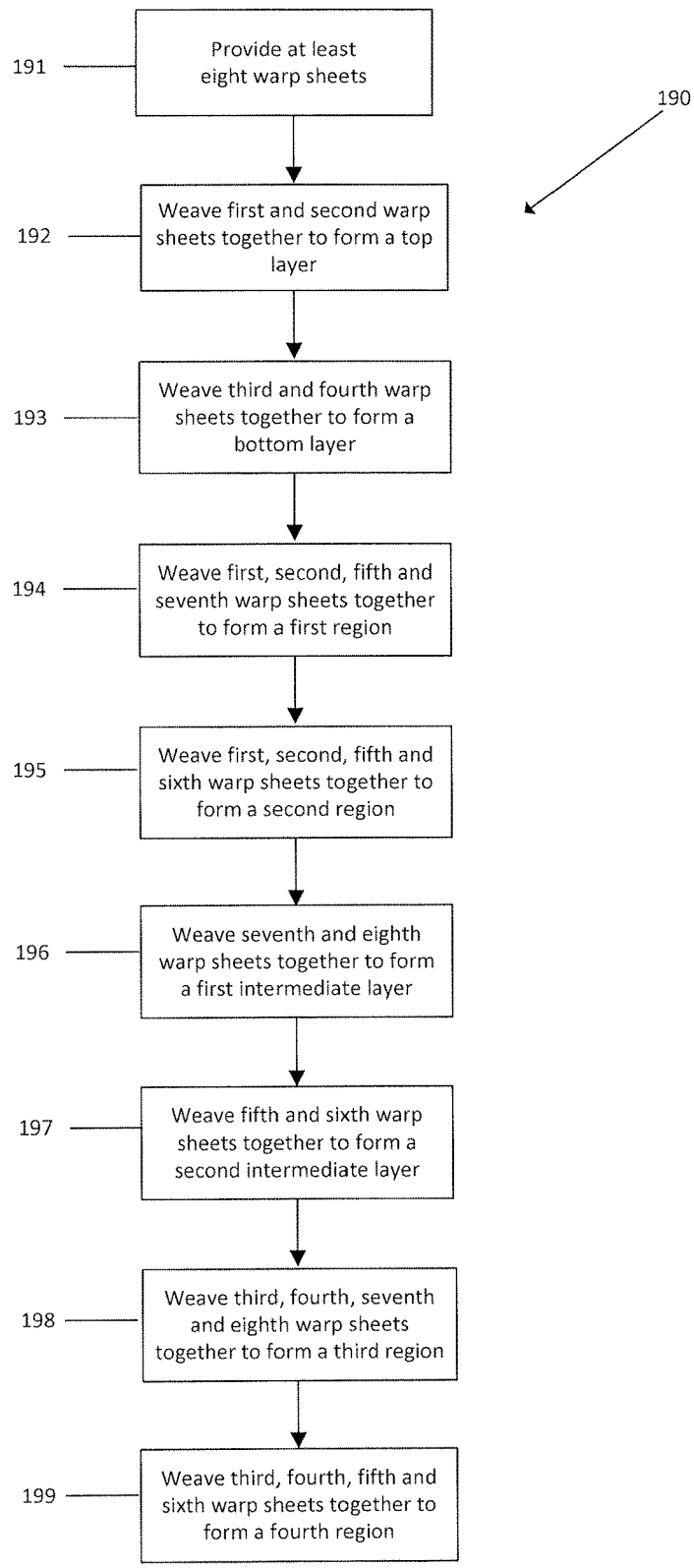
FIG. 4 is a flowchart illustrating an embodiment of a method for weaving a multi-layer fabric.

FIG. 4 is an exemplary flow chart in accordance with one embodiment illustrating and describing a method of making a multi-layered fabric, preferably with a continuous weaving process. While the method 190 is described for the sake of convenience and not with the intent of limiting the disclosure as comprising a series and/or number of steps, it is to be understood that the process does not need to be performed as a series of steps and/or the steps do not need to be performed in the order shown and described with respect to FIG. 4, but the process may be integrated and/or one or more steps may be performed together, simultaneously, at the same time, in sequence, or the steps may be performed in the order disclosed or in an alternate order. For example, the weaving may be continuous, sequential, and/or in another manner. In particular, the boxes and diagram of FIG. 4 may represent weaving events and processes, and these events and processes may happen in a varying sequence and continuously to form a desired multi-layered fabric.

At 191, warp sheets are provided. In one embodiment, at least eight (8) warp sheets are provided, but more or fewer warp sheets may be provided depending upon the desired multi-layered fabric. At 192, a first exterior or front layer is formed by weaving the first and second warp sheets. As described earlier, weaving the warp sheets refers to weaving the warp sheets with weft yarns. At 193, a second exterior or back layer is formed by weaving together the third and fourth warp sheets. At 194, a first region is formed by weaving together the first, second, fifth and seventh warp sheets. At 195, a second region may be formed by weaving together first, second, fifth and sixth warp sheets. It should also be appreciated that the process at 192 likely would not proceed to completion (e.g., forming the entire length of the top layer), but each of 192, 193, 194 and 195 would proceed for example in sequence.

At 196, a first intermediate layer may be formed by weaving together the seventh and eighth warp sheets. At 197, a second intermediate layer may be formed by weaving together the fifth and sixth warp sheets. At 198, a third region may be formed by weaving together the third, fourth, seventh, and eighth warp sheets, and at 199, a fourth region may be formed by weaving together the third, fourth, fifth, and sixth regions. These process steps may be repeated to form a multi-layered fabric.

Again, it should be appreciated that the processes of 196 likely would not proceed to completion (e.g., to form the entire length of the first intermediate layer) before any of the other processes, but rather each of the various processes 196, 197, 198, 199 would proceed in a desired sequence to produce the desired fabric. It should be appreciated that numerous first and second intermediate layers may be formed for the multi-layered fabric and that the processes shown in 191-199 may be performed in various order and numerous times to prepare the desired multi-layered fabric. For example, in FIG. 2 proceeding from left to right, and starting at the far left, processes 192, 193, 196, and 197 may be repeated in that or another sequence for a certain number of weft insertions in order to weave a portion of the top layer, bottom layer, first intermediate layer and second intermediate layer, until the start of region 120 in FIG. 2A. At that point, the processes of 192, 196 and 198 may proceed in that or a difference sequence until the start of regions 122 and 130 in FIG. 2A.

In one embodiment, the layers are not woven at the same time. The weft yarns may be inserted one by one. For example, starting at the far left of FIG. 2A where the layers are separated, the sequence may be one weft yarn woven with the two warp sheets 1, 2, of the top layer, followed by one weft yarn woven with the two warp sheets 5, 6, of the first intermediate layer, followed by one weft yarn woven with the warp sheets 7, 8 of the second intermediate layer, followed by one weft yarn woven with the warp sheets 3, 4 of the bottom layer. This sequence of weaving or stitching processes may be repeated until region 120 is reached. While each layer is being stitched, the warp sheets of the other layers remain below (or above) the warp sheets being stitched.

In one embodiment, the first region may be adjacent to the second regions and/or the third regions may be adjacent to the fourth region. The weaving process may create a large panel that may thereafter be cut to form multiple panels, or the weaving process may be used to create a custom size panel of predetermined length and width.

Additional warp sheets may be added to any one of the top, bottom, and intermediate layers, and/or additional warp sheets may be added to form additional layers. The additional warp sheets can be integrated into the first, second, third, or fourth regions, or in one or more additional regions, in a manner, for example, as disclosed above. For example, in one embodiment additional warp sheets may be added to the intermediate layers to form a more opaque fabric (less light transmitivity) in the intermediate layers.

FIG. 5 shows the side view of another embodiment of a multi-layered fabric 200. FIG. 5 shows an expanded state of a multi-layer fabric 200 formed from eight (8) warp sheets with symmetrically oriented intermediate layers 240, 250 to avoid having warp sheets that are not woven for any portion of the process and to eliminate the need for cutting any warp sheets during or post weaving. Using a weaving process that eliminates portions of the process where warp sheets are not woven may provide a more reliable process and a better resulting fabric. The multi-layered fabric 200 is formed of four layers, namely, first, face or exterior layer 210; second, back or exterior layer 225, and two intermediate layers 240 and 250. The fabric 200 can be constructed from eight (8) warp sheets and each warp sheet is assigned to a harness. Each layer (210, 225, 240, and 250) is formed from two or more warp sheets. A different number (more) of layers can be formed, and/or different number (more) of warp sheets can be used to form each layer. By using a different number of warp sheets or forming more layers, a different multi-layered fabric with different properties can result.

The multi-layered fabric shown in FIG. 5 is made from eight (8) warp sheets denoted 1, 2, 3, 4, 5, 6, 7, and 8. The fabric 200 is made from continuous weaving of repeating units (cells) that can be opened (expanded) and closed (collapsed). The arrow in FIG. 5 indicates the direction of the warp, which is the material flow in the loom during weaving. FIG. 5 shows one complete weaving cycle or repeat unit (forming two cells in this case), a portion of the preceding cycle or repeat cell on the left, and a portion of the following repeat cycle or cell on the right is shown for clarification on how the repeat cycle or repeat units are formed. The face layer 210 is woven from warp sheets 1 and 2, the back layer 225 is woven from warp sheets 3 and 4, the intermediate layer 240 is woven from warp sheets 5 and 6, and the intermediate layer 250 is woven from warp sheets 7 and 8.

Each of the intermediate layers 240 and 250 is connected by woven stitches to the face layer 210 and then separated from the face layer 210, and then connected by woven stitches to the back layer 225 in a repeating fashion. The following describes how each layer and the multi-layered fabric 200 is formed for one repeating unit. The weaving process can continue to form many repeating units and to form a large panel or multi-layered fabric structure. The weaving process may create a large panel that can thereafter be cut to form multiple panels, or the weaving process can be used to create a custom size panel of predetermined length and width.

The face layer 210 is woven from warp sheets 1 and 2 and this layer and warp sheets remain on the exterior (top) of the fabric 200 throughout the entire process. The back layer 225 is formed from warp sheets 3 and 4 and this layer and warp sheets 3, 4 remain on the exterior (bottom) of the fabric 200 throughout the entire process. Warp sheets 5 and 6, which form intermediate layer 240, are woven (stitched) with warp sheets 1 and 2 of the face layer 210 in the regions 232, 234, 236 shown along the top of FIG. 5. Then warp sheets 5 and 6 (the intermediate layer 240) are separated from the face layer 210 and warp sheets 5 and 6 are woven together for a predetermined length. Warp sheets 5 and 6 (intermediate layer 240) are then stitched with warp sheets 3 and 4 of the back layer 225 in the region 224 shown along the bottom of FIG. 5. The warp sheets 5 and 6 of intermediate layer 240 are then separated from the back warp sheets 3 and 4 of layer 225 and sheets 5 and 6 are woven together a predetermined length. The sequence is repeated to weave the desired length of the multi-layered fabric.

Intermediate layer 250 undergoes a similar, although mirror image sequence. Warp sheets 7 and 8 of the layer 250 are woven with the warp sheets 1 and 2 of the face layer 210 in the region 234 shown along the top of FIG. 5, and then the warp sheets 7 and 8 of the intermediate layer 250 are separated from the face layer 210 and woven together for a specified length (e.g., for the desired length of the intermediate layer 250). Then warp sheets 7 and 8 are woven with the warp sheets 3 and 4 of the back layer 225 in the regions 222, 224, 226 shown along the bottom of FIG. 5. Then the warp sheets 7 and 8 of intermediate layer 250 are separated from the back layer 225 and warp sheets 7 and 8 are woven together for a specified length as shown in FIG. 5. Finally, the warp sheets 7 and 8 of the center layer 250 are stitched (woven) with the warp sheets 1 and 2 of the face layer 210 at region 234 to complete one unit.

The warp sheets in the stitched regions 222, 224, 226, 232, 234, and 236 are shown in the top and bottom of FIG. 5. The lengths of the intermediate layers 240 and 250 between the stitched regions in an embodiment are equal, but in other embodiments are of different lengths. The length of regions 222, 224, and 226 can be the same or different, and the length of regions 232, 234, and 236 can be the same or different. In one embodiment, the length of regions 222, 224, 226, 232, 234, and 236 is as small as one eighth (⅛) of an inch and as large as three eighths (⅜) of an inch, and can vary therebetween in increments of about one sixteenth (1/16) of an inch, and in one embodiment may be about one quarter (¼) of an inch, although other values, both larger and smaller, are contemplated. The length of regions 222, 224, 226, 232, 234, and 236 are preferably long enough to create a reliable and strong enough tightness or coupling of the warp sheets. The length of the stitched regions in an aspect affects the shape of the intermediate layers in response to the expansion of the multi-layered fabric, affects the size and shape of the cells 260, 265 formed between the paired intermediate layers, and/or can affect how easily the paired intermediate layers separate.

Figure 6:
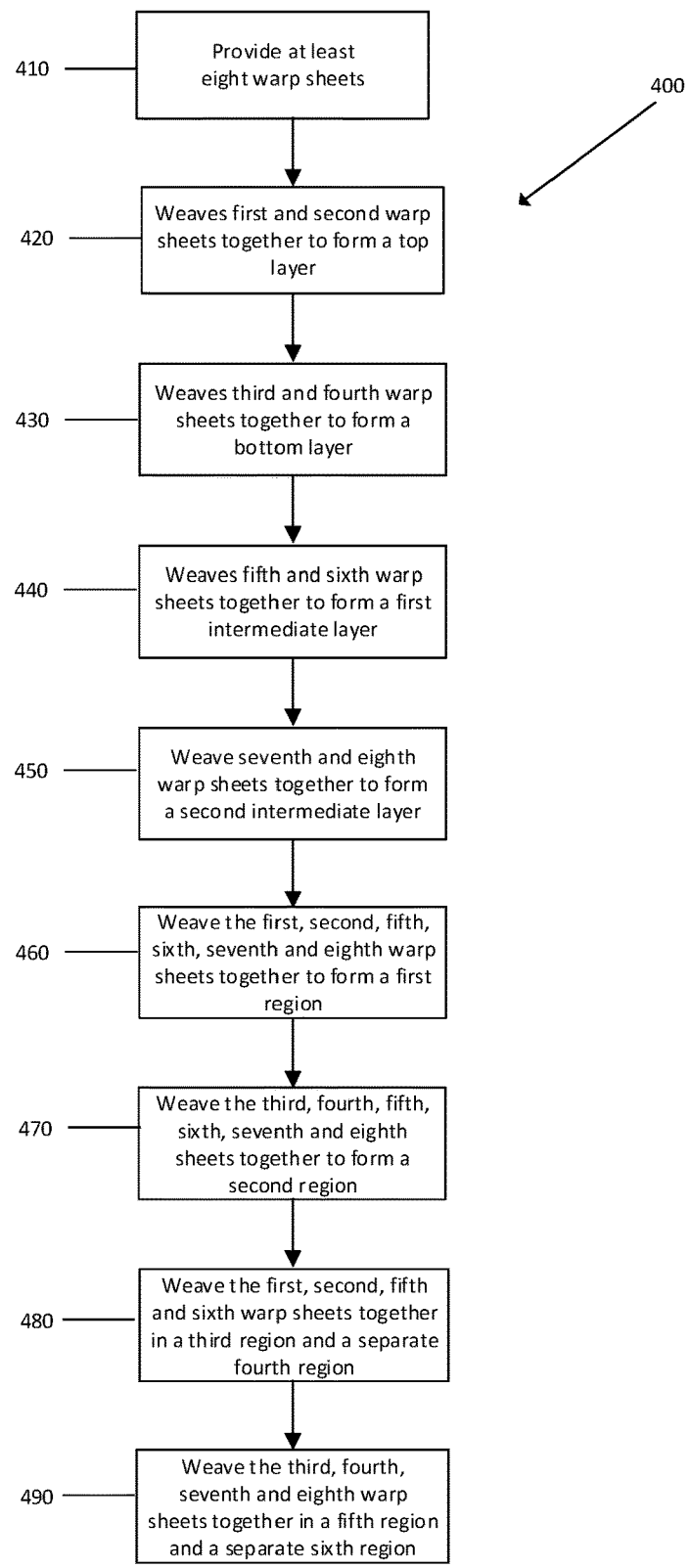
FIG. 6 is a flowchart illustrating another embodiment of a method for weaving a multi-layer fabric.

FIG. 6 is an exemplary flowchart in accordance with one embodiment illustrating and describing a method of making a multi-layered fabric, preferably with a continuous weaving process. While the method 400 is described for the sake of convenience and not with an intent of limiting the disclosure as comprising a series and/or a number of steps, it is to be understood that the process does not need to be performed as a series of steps and/or the steps do not need to be performed in the order shown and described with respect to FIG. 6, but the process can be integrated and/or one or more steps can be performed together, simultaneously, at the same time, or the steps can be performed in the order disclosed or in an alternate order. For example, the weaving process can be continuous, sequential, or in another manner. In particular, as with FIG. 4, the boxes and diagram of FIG. 4 represents weaving events and processes, and these events and processes can happen in a varying sequence and continuously to form a desired multi-layered fabric.

At 410, warp sheets are provided. In one embodiment, eight (8) warp sheets are provided, but more or fewer warp sheets can be provided depending upon the desired multi-layered fabric. For example, more warp sheets in an aspect effects the opacity and/or stiffness of the fabric. At 420, weave a first and a second warp sheet together to form a first exterior or top layer. At 430, weave a third and a fourth warp sheet together to form a second exterior or bottom layer. At 440, weave a fifth and a sixth warp sheet together to form a first intermediate or interior layer. At 450, weave a seventh and eighth warp sheet together to form a second intermediate or interior layer. At 460, weave the first, second, fifth, sixth, seventh, and eight warp sheets together to form a first region. At 470, weave the third, fourth, fifth, sixth, seventh, and eight warp sheets together to form a second region. At 480, weave the first, second, fifth, and sixth warp sheets together in a third region and in a separate fourth region. The third and fourth regions are preferably formed adjacent to the first region. At 490, weave the third, fourth, seventh, and eight warp sheets together in a or to form a fifth region and a separate sixth region. Preferably, the fifth and sixth regions are formed adjacent to the second region. The process can be repeated to form a multi-layered fabric.

As with FIG. 4, it should be appreciated that the processes of 420-490 generally are performed in various orders and numerous times to prepare the multi-layered fabric. For example, with reference to FIG. 5, starting at the far left, processes 420, 430, 440 and 450 are repeated in that order or another order for a certain number of weft insertions in order to weave a portion of the top layer, a portion of the bottom layer, a portion of the first intermediate layer, and a portion of the second intermediate order until the start of region 232 in FIG. 5. At the start and for the duration of weaving of region 232 the processes of 430, 450, and 480 proceed in that order or a different order until the start of region 234. At the start and for the duration of weaving region 234, processes 430 and 460 proceeds until the start of region 236. One of skill in the art should appreciate how the processes 420-490 can be combined in varying sequences to create the multi-layered fabric of FIG. 5 or a different multi-layered fabric.

Additional warp sheets may be added to any one of the top, bottom, and/or intermediate layers, and/or additional warp sheets may be added to form additional layers. The additional warp sheets can be integrated into the first, second, third, fourth, fifth, or sixth regions, or in one or more additional regions, in a manner, for example, as described above.

In the multi-layered fabric 200 shown in FIG. 5, separation and stitching of the two intermediate layers 240, 250 from the front layer 210 are intentionally at different points 204, 206, respectively, to facilitate the formation of, and control the size and shape of the cell 260 that may form between the two intermediate layers 240, 250. Separation and stitching of the two intermediate layers 240, 250 from the back layer 225 are also at different locations 228, 229 to facilitate formation of, and control the size and shape of the cell 260 between the intermediate layers 240, 250. Factors that influence the cell 260 and the shape of the intermediate layers 240, 250 can include the stiffness of layers 240 and 250. The stiffness of the layers 240 and 250 can be controlled by their structural parameters (warp and weft yarn sizes, warp and weft yarn materials, warp and weft thread densities, and weave) and the fabric treatment and heat setting parameters post and/or pre weaving. Additional factors that influence the formation, size and shape of the cells 260 formed between the paired intermediate layers 240, 250 include the height (e.g., length) of the regions 232, 236, 222, and 226. The multi-layered fabric 200 may also form cavities 265 between adjacent intermediate layers 240, 240 and adjacent intermediate layers 250, 250 as shown in FIG. 5.

Multi-layered fabrics may be used to form a panel that may be incorporated into a covering for an architectural feature. In one example, a flexible subassembly or panel 335 that includes a multi-layered fabric 340 may be used to form coverings 300, as shown in the illustrative embodiment of FIGS. 7A-B. The covering 300 in one embodiment generally includes a headrail, a roller (not shown) associated with the head rail, a light-controlling multi-layered fabric 340, a bottom rail or weight, and a mechanism to operate the covering (e.g., a mechanism to rotate the roller) and control the amount, quality, and manner in which light is blocked or transmitted through the panel 335, as well as the aesthetic look and appearance of the covering.

In an embodiment, the panel 335 includes a front or first exterior layer that forms a first or front vertical support member 348 and also includes a second or back exterior layer that forms a second or back vertical support member 350. In an aspect, one or more intermediate or interior layers extend between the vertical support members 348, 350 (e.g., extend from support member 348 to support member 350) and form one or more vane elements 342. The front and rear generally vertical support members 348, 350, and the vane elements 342, in an embodiment are formed from the multi-layered fabric shown and made according to the manufacturing techniques of FIGS. 1, 2A-B and 4. Alternatively, the support members 348, 350, and vane elements 342 are formed of the multi-layered fabric shown and made according to FIGS. 5 and 6. Other multi-layered fabric constructions are contemplated for the panel 335. For ease of reference, the multi-layered fabric sometimes will be referred to as a light-controlling panel, subassembly, or "panel" for short.

A roller may support and may be associated with, preferably connected to, a top end 376 of panel 335, and bottom rail 360 is associated with, preferably connected to, a bottom end 375 of panel 335. Head rail 370 supports the roller (not shown) and the panel 335 is connected to the roller in an aspect over an architectural opening. Head rail 370 generally corresponds to the shape and dimensions (e.g., width) of the top of the architectural opening.

Covering 300 in an embodiment includes a mechanism 380 for controlling the retraction, and extension of light-controlling panel 335 to control the height of the covering in the opening, the nature and quality of the light transmitted through, the view-through characteristics, and the shape and aesthetic nature of panel 335. The movement or control mechanism 380 in an aspect also controls the movement and lateral separation of support members 348, 350 and the angular orientation of vane elements 342 with respect to support members 348, 350, which will also affect the nature and quality of the light transmitted through, the view-through characteristics, the shape of the vanes 342, and aesthetic appeal of the panel 335.

In the rollup-type window covering illustrated in FIGS. 7A and 7B, the movement or control mechanism 380 rotates the roller in order to retract, extend, or angularly orient vanes 342 of light-controlling panel 335. In one example, movement mechanism 380 includes a cord 382 for rotating the roller, and/or includes a cordless mechanism, a corded mechanism, a pulley 384, a direct drive arrangement, a gear train, and/or a clutch mechanism. The system or mechanism for controlling rotation of the roller in an aspect includes an electric motor which can be controlled manually by a user, or through a pre-programmed or programmable software control unit, such as a remote control. The control mechanism 380 can also include other mechanisms including currently developed or future control mechanism.

In the multi-layer fabric 100 shown and described with respect to FIGS. 1A, 2A and 2B, that is used to form the covering 300 shown in FIGS. 7A and 7B, the angular orientation and movement of the intermediate layers 140, 150, which form the vanes 342 (e.g., vane layers 344, 346), is effected by relative movement of the front and back layers 110, 125, which form vertical support members 348, 350. In one embodiment, front and rear support members 348, 350 are coupled directly or indirectly to the roller, and preferably at different horizontally extending locations along the circumference of the roller to provide lateral movement of the front and rear support members relative to each other. In particular, the vane elements 342 can be adjusted, for example, rotated or pivoted, between different angular orientations from an open position where the vane elements are generally horizontal and substantially perpendicular to the vertical support members 348, 350 (FIG. 7A), to a closed position where the vane elements are substantially vertical and parallel to the support members 348, 350 (FIG. 7B) in order to provide and control light, view-through, shading effect, and/or privacy to the room. After the window covering is fully extended and unrolled from the roller, further rotation of the roller moves front layer 348 and/or rear layer 350 laterally or horizontally away from each other, and further moves front and rear layers 348, 350 in relative vertically opposite directions. This vertically opposite directional movement of front and rear layers 348, 350 relative to each other pivots or rotates intermediate layers 344, 346 between the support members 348, 350.

Use of the multi-layered fabric shown in FIGS. 1, 2A and 2B in a covering 300 as shown for example in FIGS. 7A and 7B preferably forms a panel 335 having a plurality of vanes 342, preferably cellular vanes 347, that extend between the exterior support members 348, 350. The cellular vanes 347 in an embodiment are formed of paired intermediate layers 140, 150. More particularly, in at least one embodiment, intermediate layer 140 in the multi-layered fabric 100 in FIG. 2A separates from intermediate layer 150 to form top layer 344 and bottom layer 346 of vane 342, particularly cellular vane 347, as shown in FIG. 7A. Cell 349 forms between top layer 344 and bottom layer 346 of cellular vane 347 formed from paired first and second intermediate layers. A space or cavity 345 is formed between front layer 348, back layer 350, the top layer 344 of a first cellular vane 347, and the bottom layer 346 of a second adjacent cellular vane 347'. The distance 332 between adjacent cellular vanes 347, 347' (e.g., adjacent pairs of intermediate layers) in an aspect factors into the size of cavity 345. Distance 332 may also assist with defining the view—through characteristics of the covering. The distance 332 between the paired intermediate layers or cellular vanes 347 effects how well and how much view-through is permitted by the panel 335. The distance 332 between adjacent cellular vanes 347, 347' is larger, usually more than double or more times larger (e.g., more than two, three, or four times larger), than the spacing 333 between the layers 344, 346 forming the cellular vanes 347, 347'. The spacing 333 is generally less than half an inch, and is usually as low as one eight (⅛) of an inch and as large as three-eighths (⅜) of an inch, but other values are contemplated depending upon the desired characteristics. The weaving and stitching of regions 124 and 132 and the location or points 128, 129 at which the paired intermediate layers 140, 150 (warp sheets) are no longer weaved with the back layer 125, and the location and points 104, 106 at which the paired intermediate layers 140, 150 are no longer weaved with the front layer 110 facilitates and affects the formation, size, and/or shape of the cellular vane 347. The use of multilayered vanes may provide improved thermal characteristics and black-out (e.g., light-blocking properties) than a single layered vane.

The generally vertical support members 348, 350 in an embodiment are substantially parallel to each other and in an aspect do not have any fold lines, creases, and the like. In other embodiments, fold lines, creases and the like are formed in the support members 348, 350. The generally vertical support members 348, 350 corresponding generally to top layers 110, 210 and bottom layers 125, 225 can be formed as, for example, sheets, panels, tapes, strips, or the like, and combinations of these elements. In one embodiment the height and width of the front and/or rear vertical support member 348, 350 is substantially the same as the height and width of the panel. Without limiting the application of the panel 335, front (or face) support member 348 which faces the interior of the architectural opening and rear (or back) support member 350 which faces the exterior of the opening in an embodiment are front and rear sheers, respectively.

The vertical support members 348, 350 as used in architectural coverings have a height (length), width, and thickness, where their thickness (generally perpendicular to their height and width) is typically relatively thin. The vertical support members 348, 350 in one embodiment generally are formed to be much thinner than their respective length (height) and/or width. The "height" of the vertical support members 348, 350, also referred to as the "length", generally and typically corresponds to and is associated with the height or vertical dimension of the covering 300 or panel 335, while the width of the vertical support members 348, 350 generally and typically corresponds to the width of the covering 300 or panel 335, and the width of the architectural structure/feature. The width of the vertical support members 348, 350 can, but in embodiments does not, extend the length of the vane elements.

The vane elements 342 can be single layered or multi-layered. Generally, but not necessarily, the vane elements 342 have a length that is larger than its width, and generally corresponds to the width of the covering. The vane elements 342 have a thickness (generally perpendicular to their length and width) and their thickness can be relatively thin, and generally are formed to be much thinner than their respective length and/or width.

Those skilled in the art will recognize that the architectural covering has many applications, may be implemented in various manners, and as such is not to be limited by the foregoing embodiments and examples. Any number of the features of the different embodiments described herein may be combined into a single embodiment. The location of particular elements, for example, the weaved and unweaved regions may be altered. Alternate embodiments are possible that have features in addition to those described herein or may have less than all the features described. Functionality may also be, in whole or in part, distributed among multiple components, in manners now known or to become known.

It will be appreciated by those skilled in the art that changes could be made to the embodiments described above without departing from the broad inventive concept. It is understood, therefore, that the invention is not limited to the particular embodiments disclosed, but it is intended to cover modifications within the spirit and scope of the invention. While features of the invention have been shown and described in exemplary embodiments, it will be understood that omissions, substitutions, and changes in the form and details of the disclosed embodiments of the architectural covering can be made by those skilled in the art without departing from the spirit of the invention. Moreover, the scope of the invention covers conventionally known, and future-developed variations and modifications to the components described herein as would be understood by those skilled in the art.

In the claims, the term "comprises/comprising" does not exclude the presence of other elements, features, or steps. Furthermore, although individually listed, a plurality of means, elements, or method steps may be implemented by, e.g., a single unit, element, component, or piece. Additionally, although individual features may be included in different claims, these may advantageously be combined, and their inclusion individually in different claims does not imply that a combination of features is not feasible and/or advantageous. In addition, singular references do not exclude a plurality. The terms "a", "an", "first", "second", etc., do not preclude a plurality. Reference signs or characters in the disclosure and/or claims are provided merely as a clarifying example and shall not be construed as limiting the scope of the claims in any way.

The foregoing description has broad application. It should be appreciated that the concepts disclosed herein may apply to many types of multi-layered fabrics, panels and/or coverings, in addition to those described and depicted herein. The discussion of any embodiment is meant only to be explanatory and is not intended to suggest that the scope of the disclosure, including the claims, is limited to these embodiments. In other words, while illustrative embodiments of the disclosure have been described in detail herein, it is to be understood that the inventive concepts may be otherwise variously embodied and employed, and that the appended claims are intended to be construed to include such variations, except as limited by the prior art.

The invention claimed is:

1. A multi-layered fabric comprising:
    a first exterior layer;
    a second exterior layer;
    one or more first intermediate layers, at least an extending portion of each first intermediate layer extending between the first and second exterior layers; and
    one or more second intermediate layers, at least an extending portion of each second intermediate layer extending between the first and second exterior layers, the extending portion of each second intermediate layer being separate from the extending portion of each first intermediate layer;
    wherein one of the one or more first intermediate layers is paired with an adjacent second intermediate layer to form a first paired vane wherein the one of the one or more first intermediate layers and the adjacent second intermediate layer of the first paired vane together form a continuous wall that fully encloses a cell in response to the first exterior layer being laterally separated from the second exterior layer, and
    wherein all warp sheets of the one of the one or more first intermediate layers are woven together with the first exterior layer for a first length and at least one but not all of the warp sheets of the one of the one or more first intermediate layers are woven together with the second exterior layer.

2. The multi-layered fabric according to claim 1, wherein all warp sheets of the adjacent second intermediate layer are woven together with the second exterior layer for a second length and at least one but not all of the warp sheets of the adjacent second intermediate layer are not woven together with the first exterior layer.

3. The multi-layered fabric according to claim 2, wherein the second length is as small as one eighth (⅛) of an inch to as large as three eighths (⅜) of an inch.

4. The multi-layered fabric according to claim 1, wherein the one or more first intermediate layers includes a plurality of first intermediate layers and the one or more second intermediate layers includes a plurality of second intermediate layers wherein the plurality of first intermediate layers are paired with a respective proximate and adjacent one of the plurality of second intermediate layers to form a plurality of paired vanes, wherein each of the plurality of first intermediate layers and each respective adjacent one of the plurality of second intermediate layers forming the plurality of paired vanes together form a continuous wall that fully encloses a cell in response to the first exterior layer being laterally separated from the second exterior layer.

5. The multi-layered fabric according to claim 4, wherein the plurality of paired vanes form, in response to lateral separation of the first exterior layer from the second exterior layer, a plurality of horizontal tubes, each one of the plurality of horizontal tubes spaced along the first exterior layer and the second exterior layer and separated from adjacent horizontal tubes of the plurality of horizontal tubes.

6. The multilayered fabric according to claim 4, further comprising a plurality of cavities formed between the first exterior layer and the second exterior layer, wherein each cavity is formed by the first exterior layer, the second exterior layer, the one or the one or more first intermediate layers from the first paired vane, and a second intermediate layer from a second paired vane wherein the second paired vane is adjacent the first paired vane.

7. The multilayered fabric according to claim 6, wherein the plurality of paired vanes form, in response to lateral separation of the first exterior layer from the second exterior layer, a plurality of horizontal tubes, each of the plurality of horizontal tubes being separated from the adjacent horizontal tubes of the plurality of horizontal tubes by at least one of the plurality of cavities.

8. The multi-layered fabric according to claim 1, wherein each first exterior layer and second exterior layer is formed from at least two warp sheets.

9. The multi-layered fabric according to claim 1, wherein each of the first and second intermediate layers are formed from at least two warp sheets.

10. The multi-layered fabric according to claim 1, wherein each of the extending portions of the first and second intermediate layers are separate from both the first exterior and second exterior layers and not interconnected with either the first exterior layer or the second exterior layer for a vane length and wherein the vane length of the one of the one or more first intermediate layers is the same as the vane length of the adjacent second intermediate layer.

11. The multi-layered fabric according to claim 1, wherein the first length is as small as one eighth (⅛) of an inch to as large as three eighths (⅜) of an inch.

12. The multi-layered fabric according to claim 1, wherein the extending portion of the one of the one or more first intermediate layers separates from the first exterior layer at a different location than where the extending portion of the adjacent second intermediate layer separates from the first exterior layer.

13. The multi-layered fabric according to claim 12, wherein the extending portion of the one of the one or more first intermediate layers separates from the second exterior layer at a different location than where the extending portion of the adjacent second intermediate layer separates from the second exterior layer.

14. The multi-layered fabric according to claim 1, wherein the first exterior and second exterior layers have a more open, less dense weave and permit more light transmission than each of the one or more first intermediate layers and each of the one or more second intermediate layers.

15. A covering for an architectural opening comprising:
a roller;
a bottom rail; and
the multi-layered fabric according to claim 1 wherein a first end of each of the first exterior and second exterior layers is associated with the roller and a second end of at least one of the first exterior layer and second exterior layer is associated with the bottom rail.

16. A covering according to claim 15, wherein in response to further rotation of the roller after the multi-layered fabric has fully unwrapped from the roller laterally separates the first exterior layer from the second exterior layer and further separates the one of the one or more first intermediate layers from the adjacent second intermediate layer to form the cell between the first and second intermediate layers.

17. The covering according to claim 15, wherein the first exterior layer forms a sheer sheet configured to permit light to transmit there-through, the second exterior layer forms a sheer sheet configured to permit light to transmit there through, and at least one of the first and second intermediate layers has lower light transmissivity than either the first exterior layer or the second exterior layer.

18. The multilayered fabric according to claim 1, wherein light passing perpendicularly through the first exterior layer impinges the extending portion of the one of the one or more first intermediate layers, traverses the cell, and impinges the extending portion of the adjacent second intermediate layer of the first paired vane.

19. A covering for an architectural feature comprising
a first exterior layer formed from at least two warp sheets interlaced with a plurality of weft yarns;
a second exterior layer formed from at least two warp sheets interlaced with a plurality of weft yarns;
a plurality of first intermediate layers, each first intermediate layer formed from at least two warp sheets interlaced with a plurality of weft yarns and each first intermediate layer having at least an extending portion extending between the first and second exterior layers; and
a plurality of second intermediate layers, each second intermediate layer formed from at least two warp sheets interlaced with a plurality of weft yarns and each second intermediate layer having at least an extending portion extending between the first and second exterior layers, the extending portion of each second intermediate layer being separate and different than the extending portion of each first intermediate layer;
wherein each first intermediate layer is paired with an adjacent second intermediate layer to form a plurality of paired vanes wherein each first intermediate layer and each respective adjacent second intermediate layer of each of the plurality of paired vanes together form a continuous wall that fully encloses a cell in response to the first exterior layer being laterally separated from the second exterior layer,
wherein the extending portion of each of the first intermediate layers of each paired vane separates from the first exterior layer at a different separation location than where the extending portion of the respective adjacent second intermediate layer of the respective paired vane separates from the first exterior layer,
wherein the at least two warp sheets of the plurality of first intermediate layers are woven with the at least two warp sheets of the first exterior layer at a plurality of first regions and at least one but not all of the at least two warp sheets of the plurality of first intermediate layers are woven with the at least two warp sheets of the second exterior layer.

20. The covering according to claim 19, wherein the extending portion of each of the plurality of first intermediate layers separates from the second exterior layer at a different separation location than where the extending portion of the respective adjacent second intermediate layer of the respective paired vane separates from the second exterior layer.

21. The covering according to claim 19, wherein each first region has a first length and each first length is as small as one eight (⅛) of an inch to as large as one half (½) of an inch.

22. The covering according to claim 19, wherein the plurality of paired vanes in response to lateral separation of the first exterior layer from the second exterior layer form a plurality of horizontal tubes, wherein each one of the plurality of horizontal tubes is spaced along the first exterior layer and the second exterior layer and separated from adjacent horizontal tubes.

23. The covering according to claim 19, further comprising a plurality of cavities formed between the first exterior layer, the second exterior layer and the plurality of paired vanes, wherein each cavity is formed by the first exterior layer, the second exterior layer, a first intermediate layer from a first paired vane, and a second intermediate layer from a second paired vane wherein the second paired vane is adjacent the first paired vane.

24. The covering according to claim 23, wherein the plurality of paired vanes in response to lateral separation of the first exterior layer from the second exterior layer form a plurality of horizontal tubes, wherein each of the plurality of horizontal tubes is separated from the adjacent horizontal tubes by at least one of the plurality of cavities.

25. The covering according to claim 19, wherein light passing perpendicularly through the first exterior layer, in response to the first exterior layer being laterally separated from the second exterior layer to form the cell, impinges the extending portion of one of the plurality of first intermediate layers, traverses the cell, and impinges the extending portion of the respective adjacent second intermediate layer of a first paired vane.

26. The covering according to claim 19, wherein the at least two warp sheets of the plurality of second intermediate layers are woven with the at least two warp sheets of the second exterior layer at a plurality of second regions and at least one but not all of the at least two warp sheets of the plurality of second intermediate layers are woven with the at least two warp sheets of the first exterior layer.

27. The covering according to claim 26, wherein the plurality of second regions each have a second length and each of the second length are as small as one eight (⅛) of an inch to as large as one half (½) of an inch.

28. A multi-layered fabric comprising:
a first exterior layer comprising at least two warp sheets;
a second exterior layer comprising at least two warp sheets;
one or more first intermediate layers wherein each first intermediate layer comprises at least two warp sheets, at least an extending portion of each first intermediate layer extending between the first and second exterior layers; and
one or more second intermediate layers wherein each second intermediate layer comprises at least two warp sheets, at least an extending portion of each second intermediate layer extending between the first and second exterior layers, the extending portion of each second intermediate layer being separate from the extending portion of each first intermediate layer;
wherein one of the one or more first intermediate layers is paired with an adjacent second intermediate layer to form a first paired vane wherein a cell is formed in response to the first exterior layer being laterally separated from the second exterior layer and in an expanded condition light passing perpendicularly through the first exterior layer impinges the extending portion of the one of the one or more first intermediate layers, traverses the cell, and impinges the extending portion of the adjacent second intermediate layer of the first paired vane, and
wherein the at least two warp sheets of the at least one of the one or more first intermediate layers are woven together with the at least two warp sheets of the first exterior layer for a first length and at least one but not all of the at least two warp sheets of the one of the one or more first intermediate layers are woven with the at least two warp sheets of the second exterior layer.

29. The multi-layered fabric according to claim 28, wherein the at least two warp sheets of the adjacent second intermediate layer are woven together with the at least two warp sheets of the second exterior layer for at least a second length and at least one but not all of the at least two warp sheets of the adjacent second intermediate layer are woven with the at least two warp sheets of the first exterior layer.

30. The multi-layered fabric according to claim 29, wherein the first length and the second length are each as small as one eighth (⅛) of an inch to as large as half (½) of an inch.

31. The multi-layered fabric according to claim 28, wherein each of the extending portions of the first and second intermediate layers are separate from both the first exterior and second exterior layers and not interconnected with either the first exterior layer or the second exterior layer for a vane length and wherein the vane length of the at least one first intermediate layer is the same as the vane length of the adjacent second intermediate layer.

32. The multi-layered fabric according to claim 28, wherein the extending portion of the one of the one or more first intermediate layers separates from the first exterior layer at a different separation location than where the extending portion of the adjacent second intermediate layer separates from the first exterior layer.

33. The multi-layered fabric according to claim 32, wherein the extending portion of the one of the one or more first intermediate layers separates from the second exterior layer at a different separation location than where the extending portion of the adjacent second intermediate layer separates from the second exterior layer.

34. The multi-layered fabric according to claim 28, wherein the one or more first intermediate layers includes a plurality of first intermediate layers and the one or more second intermediate layers includes a plurality of second intermediate layers, the plurality of first intermediate layers paired with a respective proximate and adjacent one of the plurality of second intermediate layers to form a plurality of paired vanes, wherein each of the plurality of first intermediate layers and each respective adjacent one of the plurality of second intermediate layers forming the plurality of paired vanes together form a continuous wall that fully encloses a cell in response to the first exterior layer being laterally separated from the second exterior layer, and wherein the plurality of paired vanes in response to lateral separation of the first exterior layer from the second exterior layer form a plurality of horizontal tubes, each one of the plurality of horizontal tubes spaced along the first exterior layer and the second exterior layer and separated from adjacent horizontal tubes of the plurality of horizontal tubes.

35. The multilayered fabric according to claim 28, further comprising a plurality of cavities formed between the first exterior layer and the second exterior layer, wherein each cavity is formed by the first exterior layer, the second exterior layer, the one of the one or more first intermediate layers from the first paired vane, and a second intermediate layer from a second paired vane wherein the second paired vane is adjacent the first paired vane.

36. The multilayered fabric according to claim 35, wherein the one or more first intermediate layers includes a plurality of first intermediate layers and the one or more second intermediate layers includes a plurality of second intermediate layers, the plurality of first intermediate layers paired with a respective proximate and adjacent one of the plurality of second intermediate layers to form a plurality of paired vanes, wherein the plurality of paired vanes in response to lateral separation of the first exterior layer from the second exterior layer form a plurality of horizontal tubes, wherein each of the plurality of horizontal tubes is separated from adjacent horizontal tubes by at least one of the plurality of cavities.

* * * * *